(12) United States Patent
Kato

(10) Patent No.: US 8,552,921 B2
(45) Date of Patent: Oct. 8, 2013

(54) SEMICONDUCTOR DEVICE

(75) Inventor: Taichi Kato, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 309 days.

(21) Appl. No.: 13/097,759

(22) Filed: Apr. 29, 2011

(65) Prior Publication Data

US 2011/0199270 A1 Aug. 18, 2011

Related U.S. Application Data

(62) Division of application No. 12/068,399, filed on Feb. 6, 2008, now Pat. No. 7,940,224.

(30) Foreign Application Priority Data

Feb. 9, 2007 (JP) ................................. 2007-030148

(51) Int. Cl.
*H01Q 3/24* (2006.01)

(52) U.S. Cl.
USPC ........ 343/876; 343/722; 343/745; 340/572.2; 340/10.1

(58) Field of Classification Search
USPC ............... 343/722, 745, 876; 340/10.1, 10.3, 340/572.2, 572.5
See application file for complete search history.

(56) References Cited

U.S. PATENT DOCUMENTS

| | | | |
|---|---|---|---|
| 2,748,284 A | 5/1956 | Segerstrom | |
| 2,757,287 A | 7/1956 | Stanley | |
| 3,414,826 A | 12/1968 | Vandegraaf | |
| 4,107,630 A | 8/1978 | Schucht | |
| 5,483,207 A | 1/1996 | Gabara | |
| 6,624,743 B1 | 9/2003 | Ikefuji et al. | |
| 6,700,491 B2 | 3/2004 | Shafer | |
| 6,906,596 B2 | 6/2005 | Kitamura et al. | |
| 6,933,900 B2 * | 8/2005 | Kitamori et al. | 343/713 |
| 6,963,729 B2 | 11/2005 | Uozumi | |
| 7,283,053 B2 * | 10/2007 | Mickle et al. | 340/572.2 |
| 7,471,188 B2 | 12/2008 | Koyama et al. | |
| 7,482,926 B2 * | 1/2009 | Pillai | 340/572.1 |
| 7,609,223 B2 * | 10/2009 | Manasson et al. | 343/876 |
| 7,616,163 B2 * | 11/2009 | Montgomery et al. | 343/745 |
| 7,816,990 B2 | 10/2010 | Hijikata et al. | |

(Continued)

FOREIGN PATENT DOCUMENTS

| | | |
|---|---|---|
| EP | 1022677 A | 7/2000 |
| EP | 1160915 A | 12/2001 |

(Continued)

*Primary Examiner* — Tho G Phan
(74) *Attorney, Agent, or Firm* — Eric J. Robinson; Robinson Intellectual Property Law Office, P.C.

(57) ABSTRACT

It is an object of the present invention to provide a semiconductor device which can be surely supplied electric power by electromagnetic waves in different frequency bands without preventing reduction in size and weight of a semiconductor device. A semiconductor device capable of wireless communication is provided with a frequency determining circuit which detects the frequency of the electromagnetic waves received by the antenna and a circuit which automatically adjusts impedance in accordance with information from the frequency determining circuit, and the semiconductor device communicates and obtains electric power by one antenna. For adjustment of impedance, a circuit which can change the inductance or the capacitance, or an antenna which can change the length is used.

10 Claims, 27 Drawing Sheets

(56) References Cited

U.S. PATENT DOCUMENTS

| | | | |
|---|---|---|---|
| 7,936,272 B2 * | 5/2011 | Stewart | 340/572.5 |
| 8,164,455 B2 * | 4/2012 | Fukuda | 340/572.1 |
| 2005/0280509 A1 | 12/2005 | Tanaka et al. | |
| 2006/0232419 A1 | 10/2006 | Tomioka et al. | |
| 2008/0129639 A1 | 6/2008 | Mitsugi | |
| 2009/0302456 A1 | 12/2009 | Oikawa et al. | |

FOREIGN PATENT DOCUMENTS

| | | |
|---|---|---|
| JP | 10-187916 A | 7/1998 |
| JP | 2001-344574 A | 12/2001 |
| JP | 2003-067693 A | 3/2003 |
| JP | 2005-204493 A | 7/2005 |
| JP | 2005-530251 | 10/2005 |
| JP | 2006-005651 | 1/2006 |
| JP | 2006-295729 | 10/2006 |
| WO | WO-03/107475 | 12/2003 |

* cited by examiner

FIG. 7

| | Y(0) | Y(1) | Output |
|---|---|---|---|
| matched | 1(H) | 1(H) or 0(L) | 0(L) |
| not matched | 0(L) | 1(H) | 1(H) |
| not supplied Power | 0(L) | 0(L) | 0(L) |

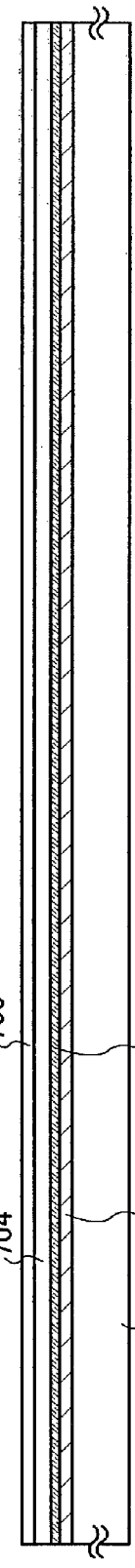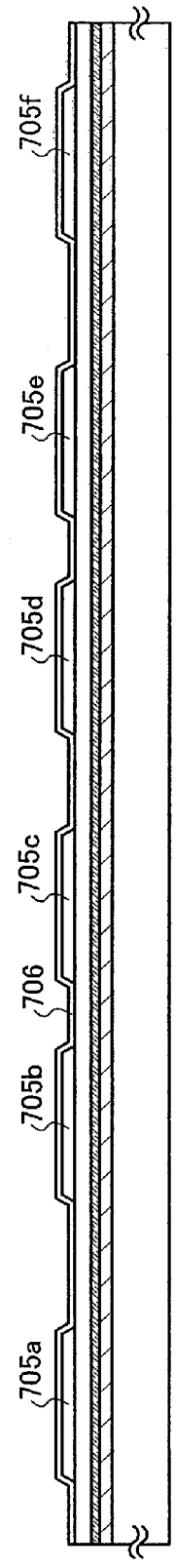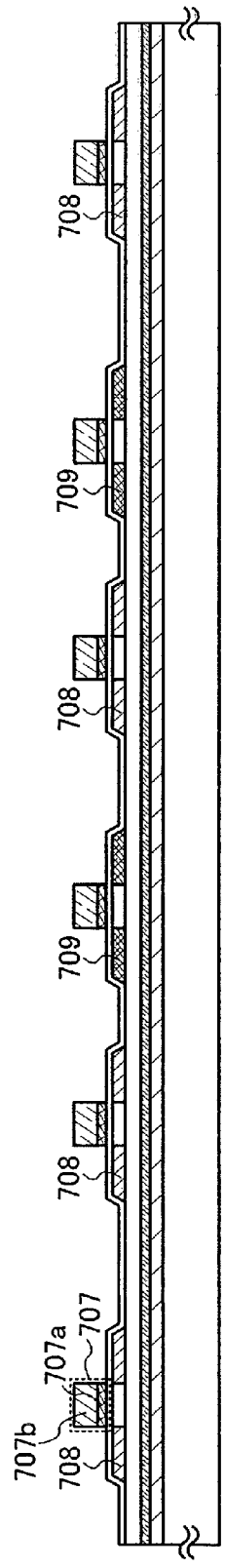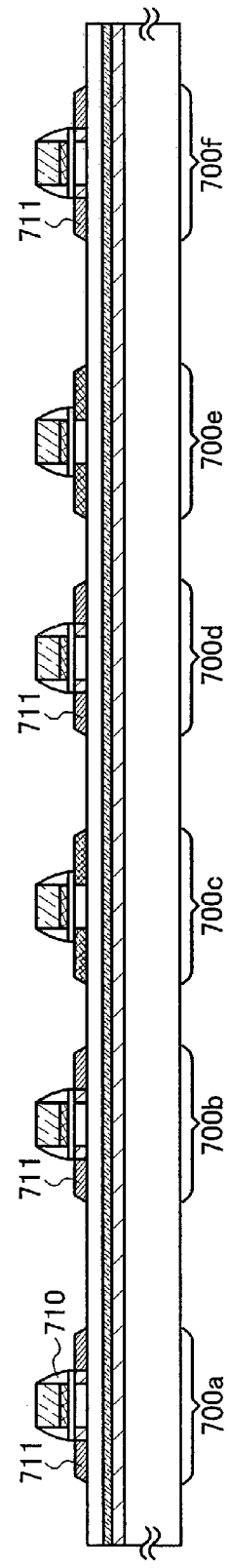
FIG. 11A
FIG. 11B
FIG. 11C
FIG. 11D

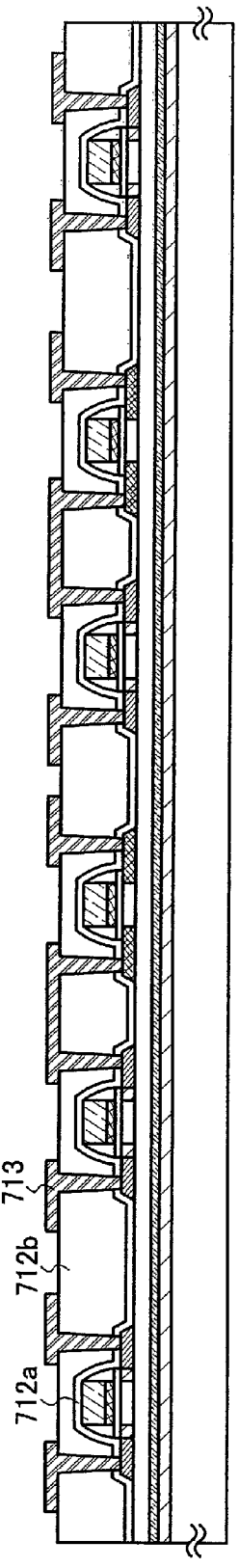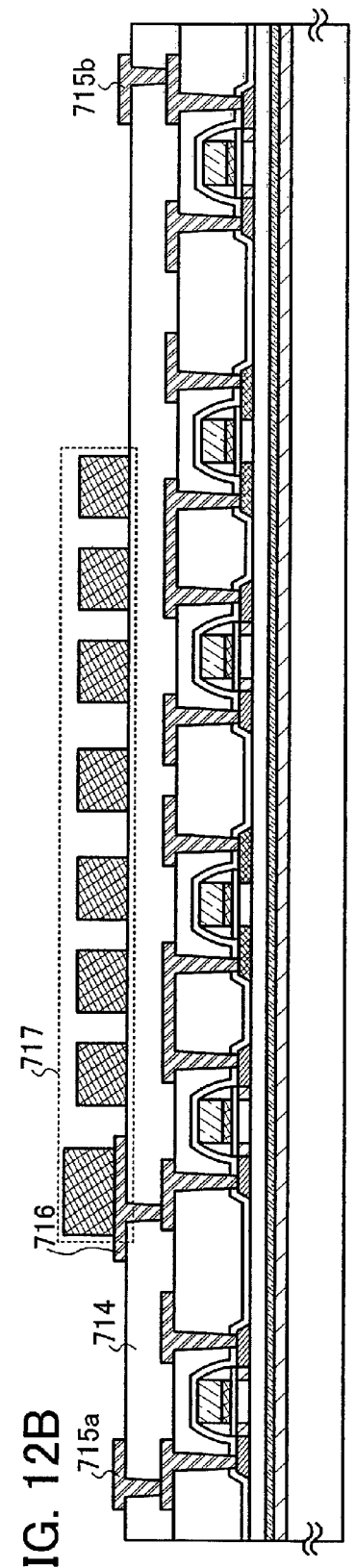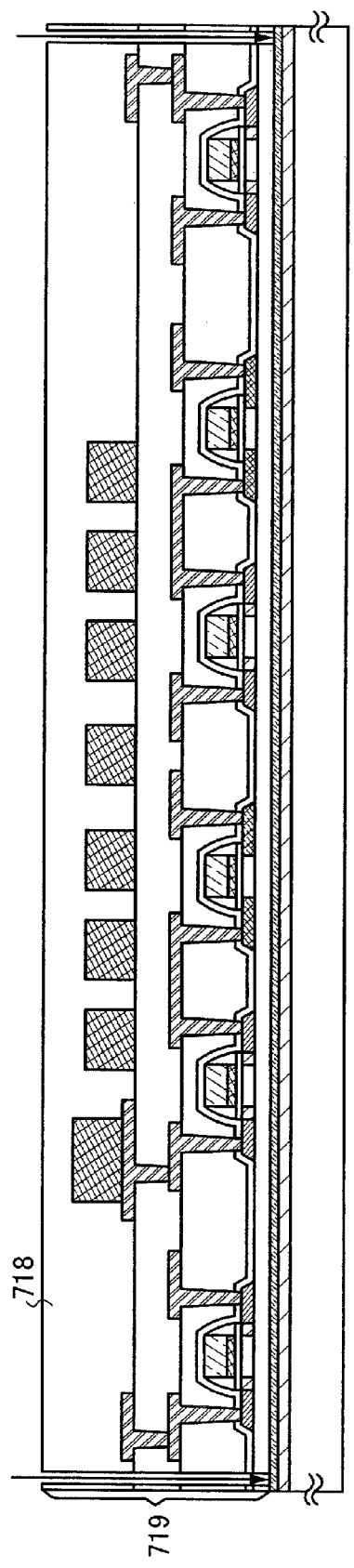

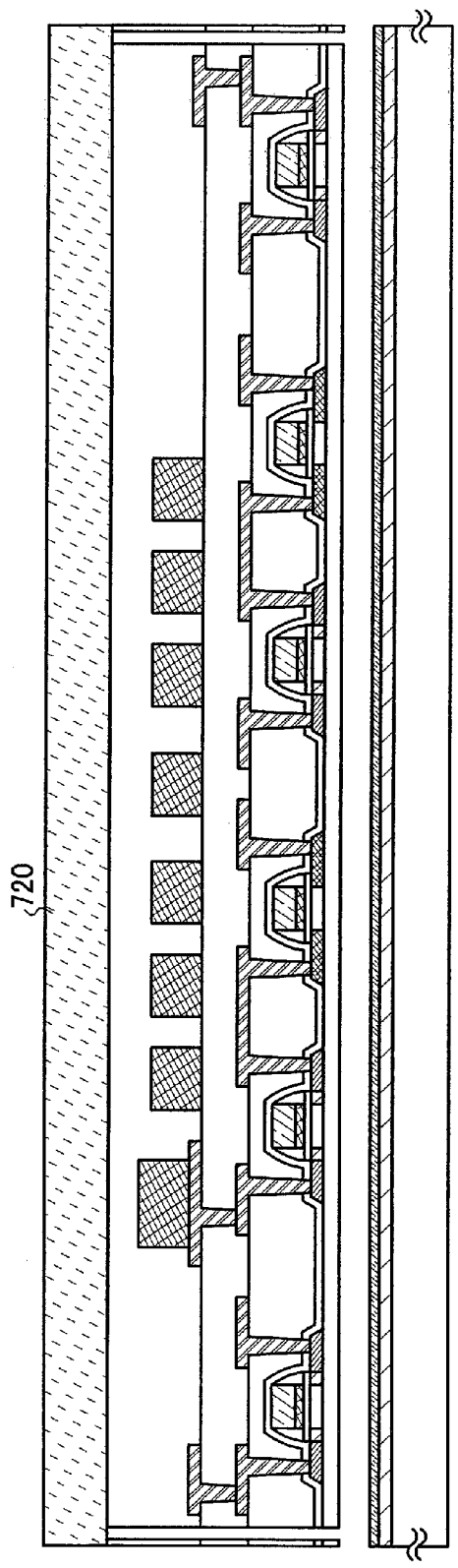
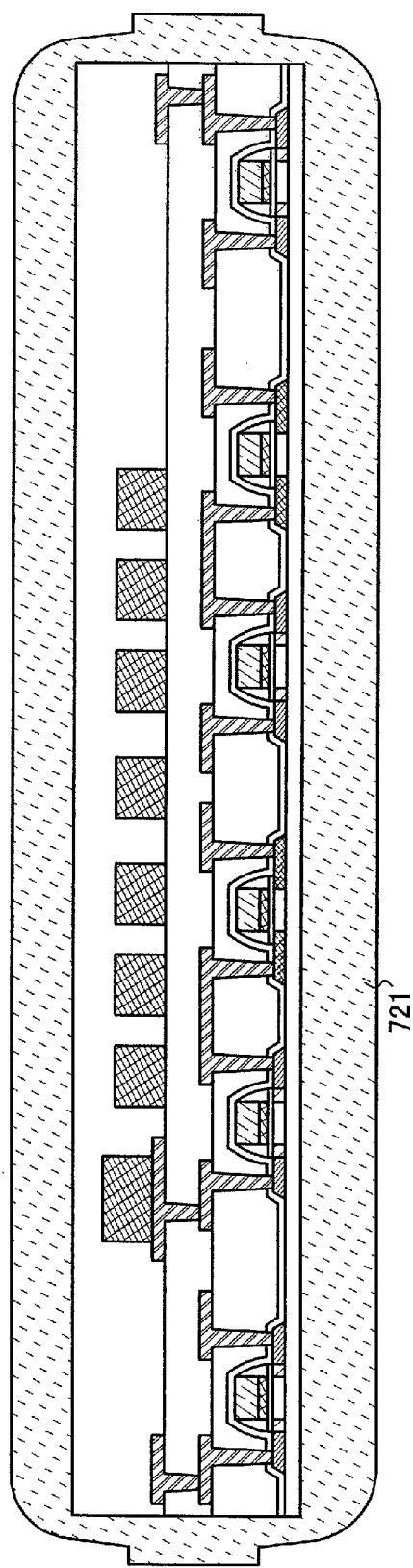
FIG. 13A
FIG. 13B

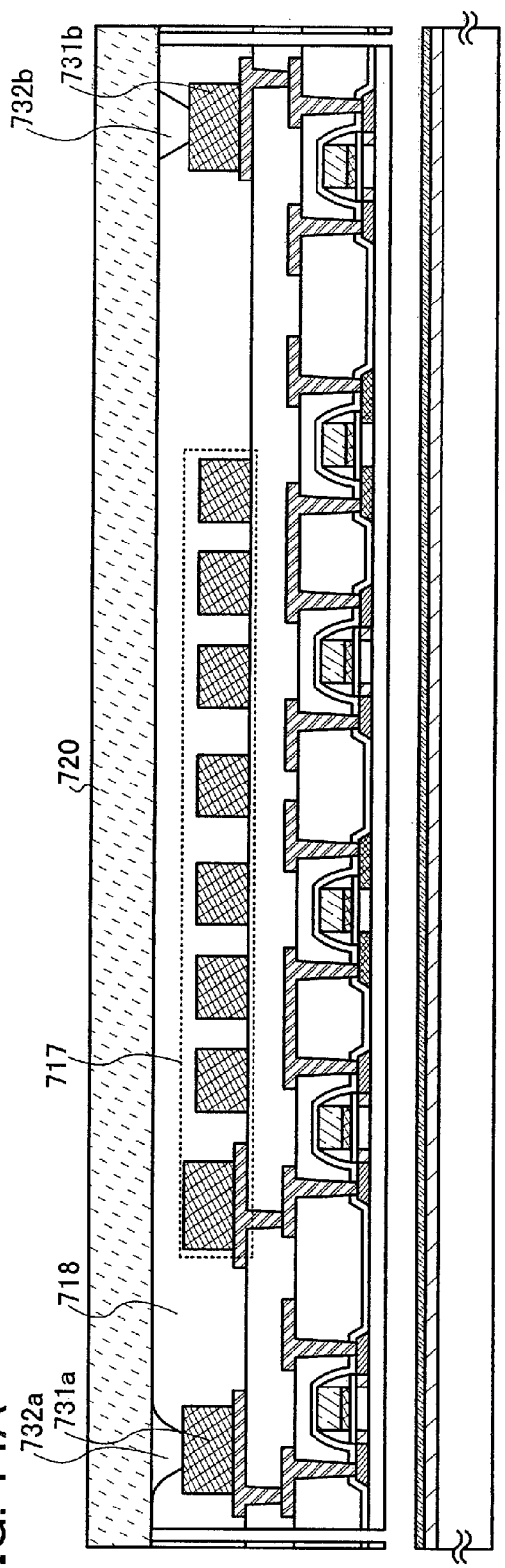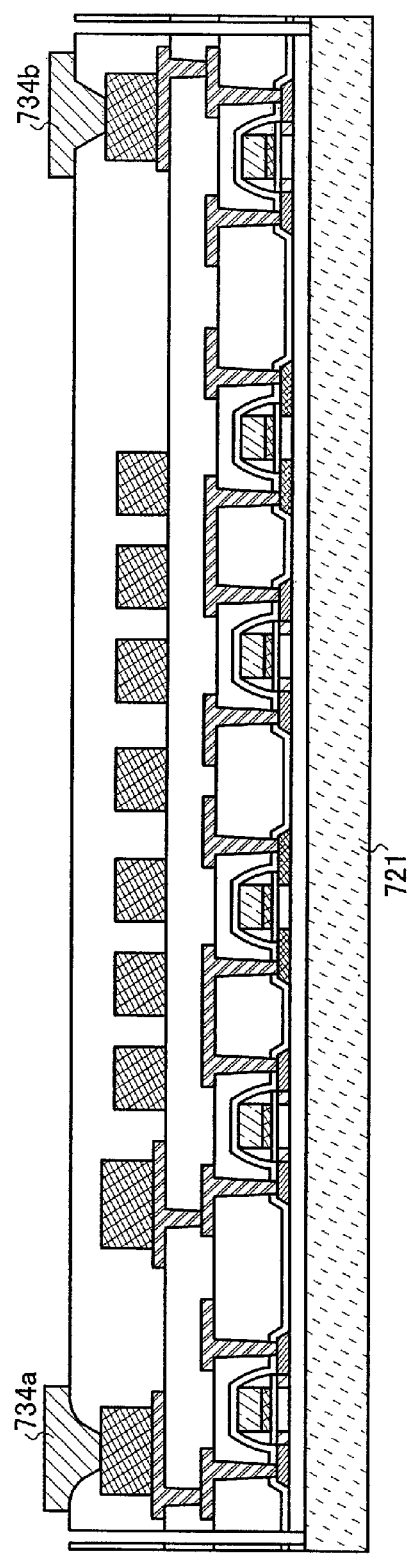

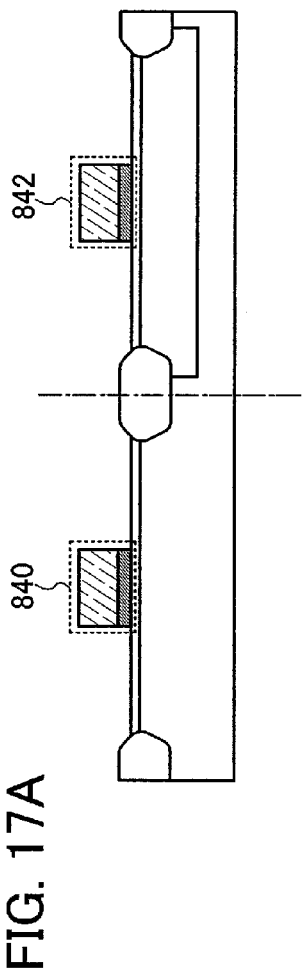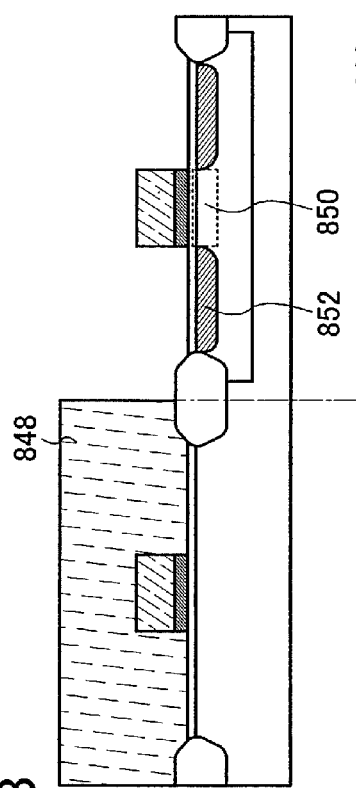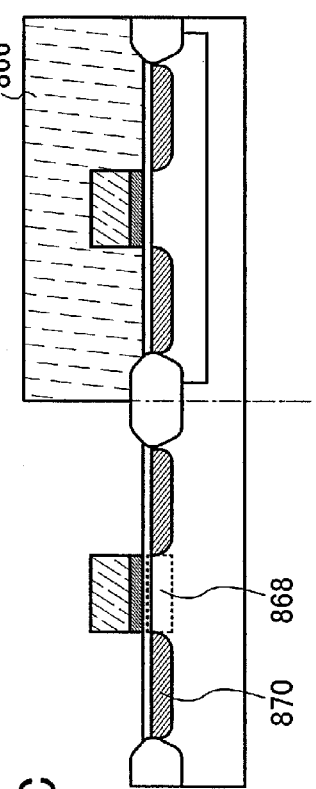

SEMICONDUCTOR DEVICE

BACKGROUND OF THE INVENTION

1. Field of the Invention

The present invention relates to a semiconductor device capable of wireless communication.

2. Description of the Related Art

In recent years, development of a semiconductor device which can transmit or receive data wirelessly has been proceeding, and has attracted attention. A semiconductor device capable of wireless communication which is called an RFID (radio frequency identification), an RF chip, an RF tag, an IC chip, an IC tag, a wireless chip, a wireless tag, an electronic chip, an electronic tag, a wireless processor, a wireless memory, or the like, is beginning to be introduced to a part of market for a purpose of stock management. Desired features of the semiconductor device for goods management are compact, lightweight convenient, high-security, and inexpensive. In addition, a semiconductor device capable of wireless communication like this is mounted, for example, on a card, and applications for various fields are considered.

A semiconductor device capable of wireless communication which is in practical use now has an antenna layer and an element formation layer having a circuit which is configured with a transistor. Such a semiconductor device capable of wireless communication communicates with a reader/writer wirelessly via electromagnetic waves, whereby data is transmitted and received to and from the reader/writer, or electric power which is necessary for the operation of a semiconductor device is received from the reader/writer whereby the semiconductor device is operated.

Although a semiconductor device capable of wireless communication can be reduced in size and weight, the communication distance and the amount of supplied electric power can be changed by various factors. Therefore, size reduction is not always possible. In particular, influence of the shape of an antenna is significant.

A semiconductor device capable of wireless communication can be classified into some sorts depending on frequency bands to communicate. These semiconductor devices capable of wireless communication have features and they are selected for the purpose of use. The shape of an antenna may be changed in each time, or one chip may be provided with a plurality of antennas in order to ensure the communication distance and electric power in each frequency band. Reference 1 (Japanese Published Patent Application No. 2006-295729) is an example of one chip provided with a plurality of antennas.

In addition, many semiconductor devices capable of wireless communication now in practical use are so-called passive type which does not have a built-in battery but is supplied electric power from the external to operate, and the passive type is major. On the other hand, active type is also developed and examined to come into practical use. Further, semi-active type having a battery to which electric power is supplied wirelessly is also developed.

SUMMARY OF THE INVENTION

It is difficult in actuality to change the shape of an antenna into various shapes every time in order to communicate and obtain electric power in a plurality of frequency bands. In addition, providing a plurality of antennas prevents reduction in size and weight of the semiconductor device.

It is an object of the present invention to provide a semiconductor device which includes an antenna, and can communicate and supply electric power in a plurality of frequency bands.

A semiconductor device of the present invention communicates or obtains electric power in a plurality of frequency bands using one antenna. Specifically, it is another object to provide a semiconductor device capable of wireless communication having one antenna, and the semiconductor device which includes a detecting means for a frequency of the received electromagnetic waves, an impedance changing means for matching the impedances automatically using the information of detecting means, and can communicate and obtain electric power.

As an impedance changing means, an inductance generation circuit, a rectifier circuit or a demodulation circuit can be used.

A semiconductor device of the present invention uses a determining circuit frequency as a detecting means for the frequency of the received electromagnetic waves. In addition, a semiconductor device of the present invention includes a circuit for changing impedance in response to the output from the frequency determining circuit of the frequency determining circuit. In addition, a switch for controlling may be provided in order to change the length of an antenna in response to the output the frequency determining circuit.

For example, the frequency determining circuit the frequency determining circuit may be provided with two comparators. Note that the number of the comparators is not limited to two, and three or more of comparators may be provided as necessary.

Two capacitor elements having different capacitance or a coil may be used in order to change impedance in accordance with the frequency.

Further, it is preferable that a semiconductor device of the present invention has a power supply (a power storage portion), and electric power is supplied to the power supply by wireless communication.

Note that reference potential written in this specification is the reference potential of the entire circuit. A portion where a graphic symbol of ground is written in the drawings signifies being connected to the reference potential of the entire circuit.

Note that in this specification, impedance is the ratio of a voltage and a current in an AC circuit. Impedance Z is represented by the equation: $Z=R+j(\omega L - 1/\omega C)$. Z is impedance, R is a resistor, j is the imaginary unit, $\omega$ is angular frequency, C is a capacitance, and L is inductance. Here, since R is a resistor, the power consumption increases with increase of R. Therefore, it is preferable that Z is changed by changing C and R.

Note that in this specification, a reader/writer is a device having a function of transmitting data to a semiconductor device capable of wireless communication and receiving data from the semiconductor device capable of wireless communication. Note that a reader/writer is not necessary to have functions of both transmitting and receiving data, and may have only a function of transmitting data to a semiconductor device capable of wireless communication or a function of receiving data from a semiconductor device capable of wireless communication.

Note that in this specification, a coil is a portion obtained by patterning a conductive film the like so as to have a desired shape and is provided in order to adjust inductance. However, the coil is not provided for purpose of wireless transmission and reception of signals. Therefore, an antenna and a coil have different inductances by the difference in the number of windings, the shape, or the like. For example, when impedance of the entire semiconductor device is 10+j100(Ω), inductance of an antenna suitable for receiving radio waves at a frequency of 2.4 GHz is approximately 6.0 (nH), inductance of an antenna suitable for receiving radio waves at a frequency of 953 MHz is approximately 16 (nH), and inductance of an antenna suitable for receiving radio waves at a frequency of 915 MHz is approximately 17 (nH). Thus, the coil for adjusting inductance which is suitable for receiving radio waves at a plurality of frequencies should be provided, and one or the plural number of coils are provided.

In accordance with the present invention, communication and supplying electric power in a plurality of different frequencies with one antenna can be performed. When electromagnetic waves in a plurality of different frequency bands which are different from each other are received, electric power can be supplied using the suitable frequency band by adjusting impedance automatically.

Manufacturing a chip having one antenna according to the present invention, the yield is improved and the costs can be reduced because the number of manufacturing steps is reduced, as compared to the case that a plurality of antenna are provided. In addition, the semiconductor device can be reduced in size and weight compared to the case that a plurality of antennas are provided.

Since the number of the antennas of the present invention is one, compression bonding or the like the antenna can be performed by only one step. Thus, the yield is improved as compared to the case that a plurality of antenna are provided.

Since the best impedance for the antenna can be obtained in accordance with the present invention, a larger amount of electric power can be obtained by supplying power via wireless communication.

BRIEF DESCRIPTION OF THE DRAWING

In the accompany drawings:

FIG. 7 is a diagram illustrating output of a frequency determining circuit included in a semiconductor device of the present invention;

FIG. 11A to 11D are diagrams illustrating a manufacturing process of a semiconductor device of the present invention;

FIG. 12A to 12C are diagrams illustrating a manufacturing process of a semiconductor device of the present invention;

FIGS. 13A and 13B are diagrams illustrating a manufacturing process of a semiconductor device of the present invention;

FIGS. 14A and 14B are diagrams illustrating a manufacturing process of a semiconductor device of the present invention;

FIG. 17A to 17C are diagrams illustrating a manufacturing process of a semiconductor device of the present invention;

Embodiment modes and embodiments of the present invention will hereinafter be described with reference to drawings. However, the present invention can be carried out in many different modes, and it is easily understood by those skilled in the art that modes and details herein disclosed can be modified in various ways without departing from the spirit and the scope of the present invention. Therefore, the present invention should not be interpreted as being limited to the description of the embodiment modes and embodiments to be given below.

[EMBODIMENT MODE 1]

Figure 1:
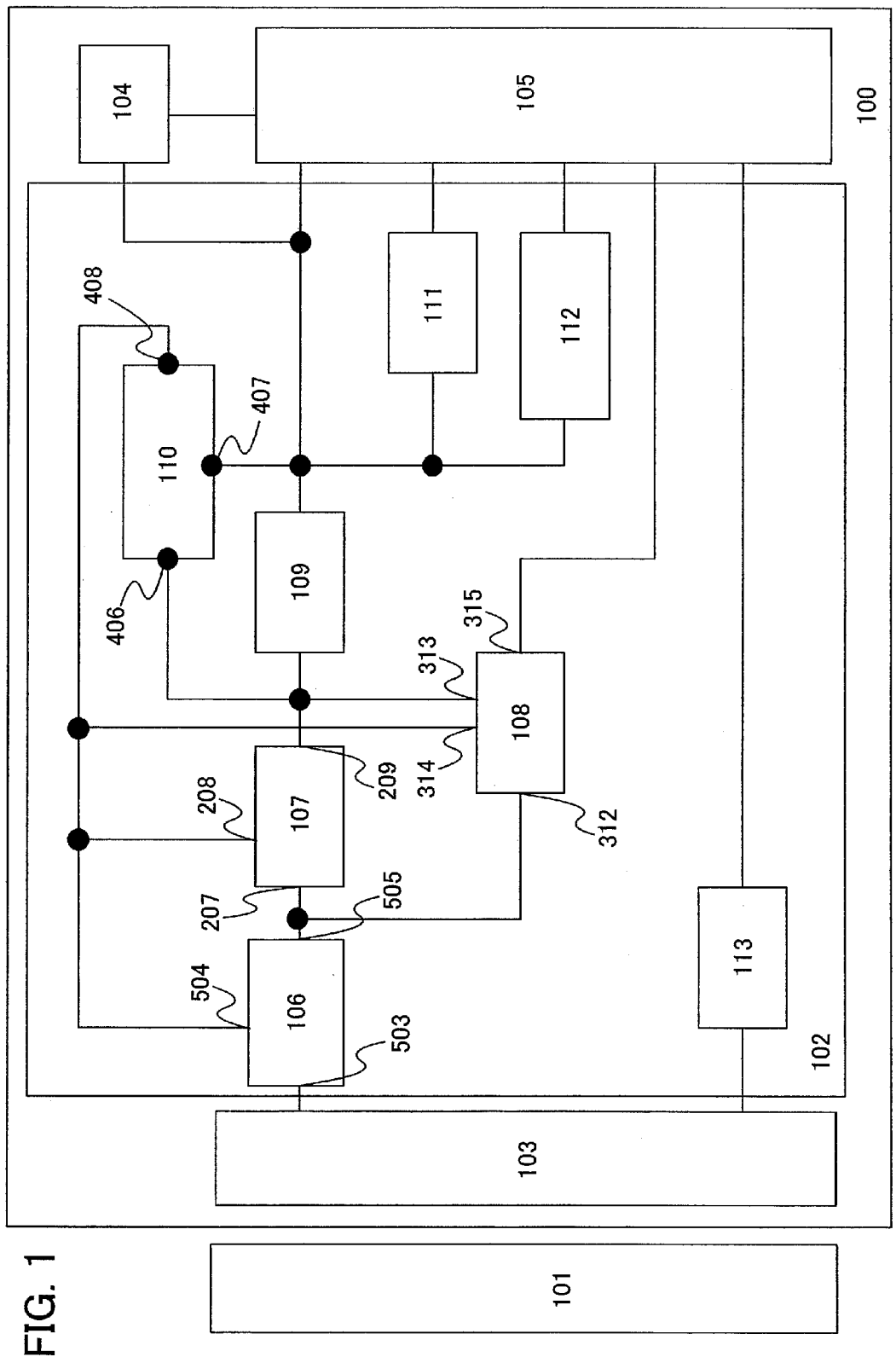
FIG. 1 is a diagram illustrating an example of a semiconductor device of the present invention.

A semiconductor device of the present invention is described, with reference to the drawings. FIG. 1 shows a semiconductor device of the present invention. A semiconductor device 100 shown in FIG. 1 includes an antenna 103, a logic circuit 105, a memory circuit 104, and an analog circuit 102. The antenna 103 is connected to the analog circuit 102. The analog circuit 102 is connected to the logic circuit 105. The logic circuit 105 is connected to the analog circuit 102 and the memory circuit 104.

The semiconductor device 100 transmits and receives data wirelessly to and from a reader/writer 101 via electromagnetic waves. In addition, a system such that electric power is supplied to the semiconductor device 100 by electromagnetic waves transmitted from the reader/writer 101 may be employed. The reader/writer 101 is preferably connected to a computer which controls the reader/writer 101 through a communication line.

The antenna circuit 103 has an antenna and a capacitor element, receives electromagnetic waves transmitted from the reader/writer 101, and inputs a received signal to a rectifier circuit 107 and a demodulation circuit 108 which are included in the analog circuit 102. Further, the antenna circuit 103 receives a signal whose carrier waves are modulated from the analog circuit 102 and transmits a response signal to a device of the transmitter.

There are no limitations on the shape of the antenna in particular that can be used in the present invention. Therefore, an electromagnetic coupling method, an electromagnetic induction method, an electromagnetic wave method, or the like can be used as a transmission method of a signal for the antenna circuit 103 of the semiconductor device 100. Executor may select the transmission method, as appropriate, in consideration of application, and an antenna with the most appropriate length and shape may be provided according to the selected transmission method.

In the case where an electromagnetic coupling method or an electromagnetic induction method (for example, 13.56 MHz band) is used as a transmission method, electromagnetic induction by change of the electric field density is utilized; therefore, a conductive film serving as an antenna is formed into a circular shape (such as a loop antenna) or a spiral shape (such as a spiral antenna).

In a case where a microwave method (for example, UHF band (860 to 960 MHz band), 2.45 GHz band, or the like), which is one of the electromagnetic wave methods, is used as the transmission method, a length or a shape of a conductive film serving as an antenna may be set as appropriate in consideration of a wavelength of an electromagnetic wave used for signal transmission. For example, the conductive film serving as an antenna can be formed into a linear shape (such as a dipole antenna), a flat shape (such as a patch antenna), or the like. Further, the shape of the conductive film serving as an antenna is not limited to the linear shape, and the conductive film may be formed into a curve shape, a meandering shape, or a shape obtained by combining them in consideration of a wavelength of an electromagnetic wave.

Here, examples of a shape of the antenna provided in antennas of the antenna circuit 103 are shown in FIG. 24. For example, as shown in FIG. 24A, a structure, which the chip 150 provided with a signal processing circuit may be entirely surrounded by an antenna 151, may be employed. In addition, as shown in FIG. 24B, an antenna 153 with narrow width may be provided around a chip 152 provided with a signal processing circuit. In addition, as shown in FIG. 24C, a chip 154 having a signal processing circuit and an antenna 155 that has the shape for receiving electromagnetic waves with high frequency may be provided. Further, as shown in FIG. 24D, a chip 156 having a signal processing circuit and an antenna 157 which is extended in a stick shape may be provided. In addition, a antenna of the antenna circuit 103 may have a shape obtained by combining these shapes of antennas. Furthermore, a antenna of the antenna circuit 103 may be an on-chip antenna which is formed on the elements using thin film transistors of the semiconductor device 100.

A power supply voltage which is the output of a constant voltage circuit 109, an output signal of an oscillator circuit 111, an output signal of a reset generation circuit 112, an output signal of the demodulation circuit 108, and an output signal of a memory circuit 104 are inputted to the logic circuit 105 from the analog circuit 102. The logic circuit 105 operates to transmit the output signal to a modulation circuit 113 in response to the condition of the output signal from the demodulation circuit 108. For example, when the content of the output signal from the demodulation circuit 108 is "send the data of the memory circuit 104 to the reader/writer 101", a data is obtained by access to the memory circuit 104 and transmitted to the modulation circuit 113.

At least unique data (individual identification information (ID)) of the semiconductor device 100 is stored in the memory circuit 104. The memory circuit 104 has a circuit which includes a memory element and a control circuit performing writing and reading data. The memory circuit 104 has one or plural kinds of memories selected from an organic memory, a DRAM (dynamic random access memory), a SRAM (static random access memory), a FeRAM (ferroelectric random access memory), a mask ROM (read only memory), a PROM (programmable read only memory), an EPROM (electrically programmable read only memory), an EEPROM (electrically erasable programmable read only memory) or a flash memory. When the content of stored data is unique data (individual identification information (ID), or the like) of the semiconductor device 100, a nonvolatile memory which can retain the memory without supplying electric power is desirably used. When the memory is retained temporarily in case of the semiconductor device 100 performing a process, a volatile memory may be used. In particular, a nonvolatile memory is desirably used when the semiconductor device 100 is a so-called passive type that does not have a battery. Further, when unique data (individual identification information (ID) or the like) of the semiconductor device 100 is stored, a non-rewritable memory is desirably used from a security standpoint so that illegal writing is prevented.

Next, the analog circuit 102 included in the semiconductor device 100 shown in FIG. 1 will be described. The analog circuit 102 has the modulation circuit 113, the constant voltage circuit 109, the oscillator circuit 111, the reset generation circuit 112, the rectifier circuit 107, the demodulation circuit 108, a frequency determining circuit 110, and an inductance generation circuit 106. The inductance generation circuit 106 is connected between an output portion of the antenna circuit 103 and the rectifier circuit 107. Note that a limiter circuit or the like may be added to the analog circuit 102 in order to stabilize the operation of the semiconductor device 100.

A signal whose carrier waves are modulated is transmitted from the modulation circuit 113 to the antenna circuit 103 in accordance with an output signal from the logic circuit 105.

The constant voltage circuit 109 generates a constant voltage in accordance with the output from the rectifier circuit 107. The generated constant voltage is supplied to the oscillator circuit 111, the reset generation circuit 112, and the logic circuit 105.

The oscillator circuit 111 generates a clock signal by inputted the constant voltage which is generated at the constant voltage circuit 109, and the clock signal is supplied to the logic circuit 105.

The reset generation circuit 112 generates a reset signal by inputted the constant voltage which is generated at the constant voltage circuit 109, and the reset signal is supplied to the logic circuit 105.

System of the rectifier circuit 107 and the demodulation circuit 108 of the semiconductor device 100 shown in FIG. 1 are different from system of conventional rectifier circuits and demodulation circuits. The specific system is described below.

Figure 2:
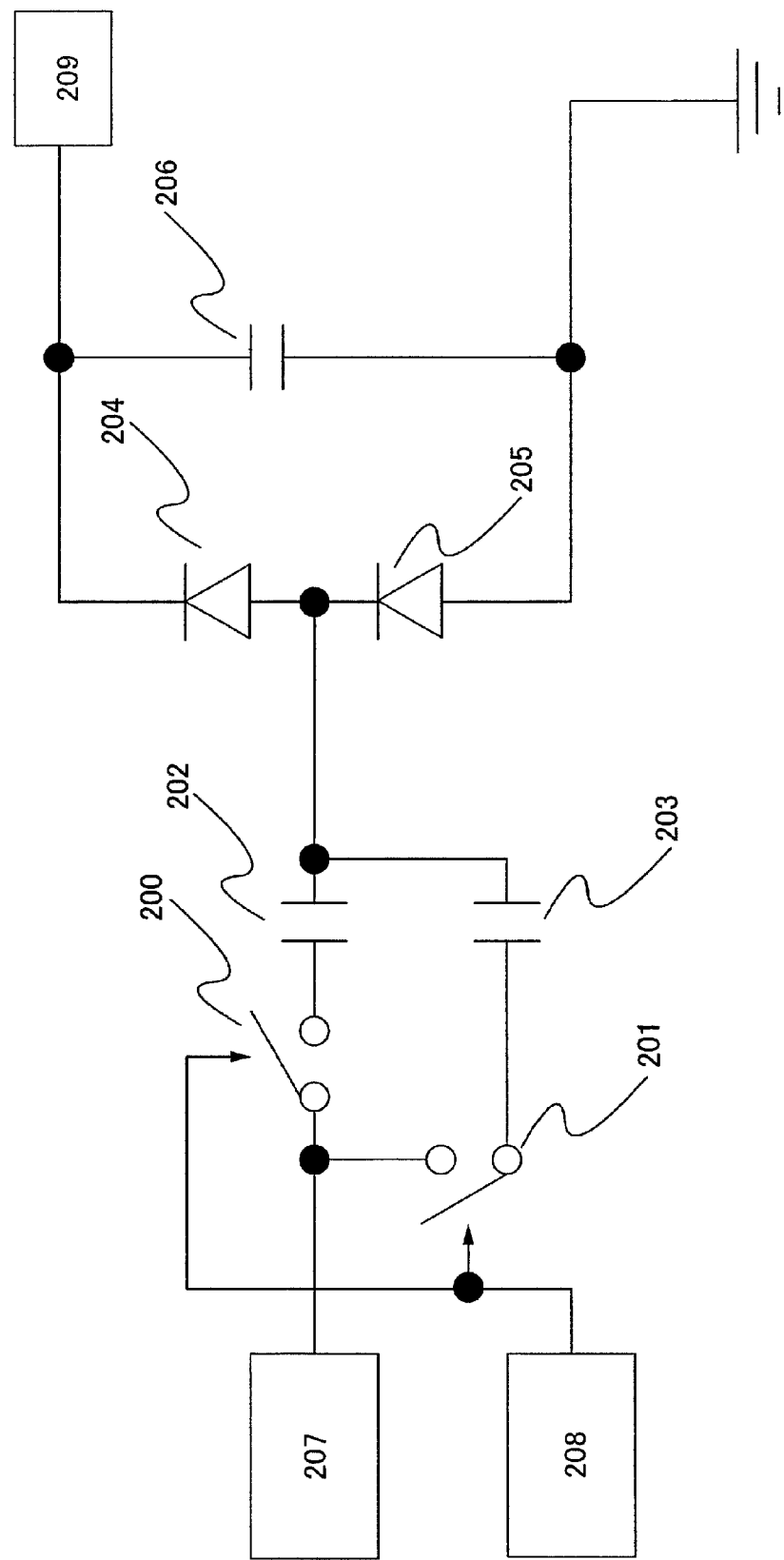
FIG. 2 is a diagram illustrating an example of a rectifier circuit included in a semiconductor device of the present invention.

FIG. 2 shows the rectifier circuit 107 included in the semiconductor device 100 in FIG. 1. The rectifier circuit 107 has a first input portion 207, a second input portion 208, a first switch 200, a second switch 201, a first capacitor element 202, a second capacitor element 203, a first diode 204, a second diode 205, a third capacitor element 206, and an output portion 209. The first input portion 207 is connected to an output portion 505 of the inductance generation circuit 106. The second input portion 208 is connected to an output portion 408 of the frequency determining circuit 110. The output portion 505 is connected to an input portion of the constant voltage circuit 109, a first input portion 406 of the frequency determining circuit 110, and a second input portion 313 of the demodulation circuit 108. The first switch 200 is connected to the first input portion 207 and one terminal of the first capacitor element 202, and turning on or off of the first switch 200 is controlled by the second input portion 208. The second capacitor element 203 is connected to the second switch 201 and the other terminal of the first capacitor element 202. The second switch 201 is connected to the first input portion 207 and one terminal of the second capacitor element 203, and turning on or off of the second switch 201 is controlled by the second input portion 208. The output of the antenna circuit 103 is smoothed by the rectifier circuit 107, and a power supply voltage is generated. A power supply voltage is adjusted using charging and discharging of the first capacitor element 202 or the second capacitor element 203 so that the power supply voltage remains stabile potential to have a constant difference from a reference potential.

Figure 3:
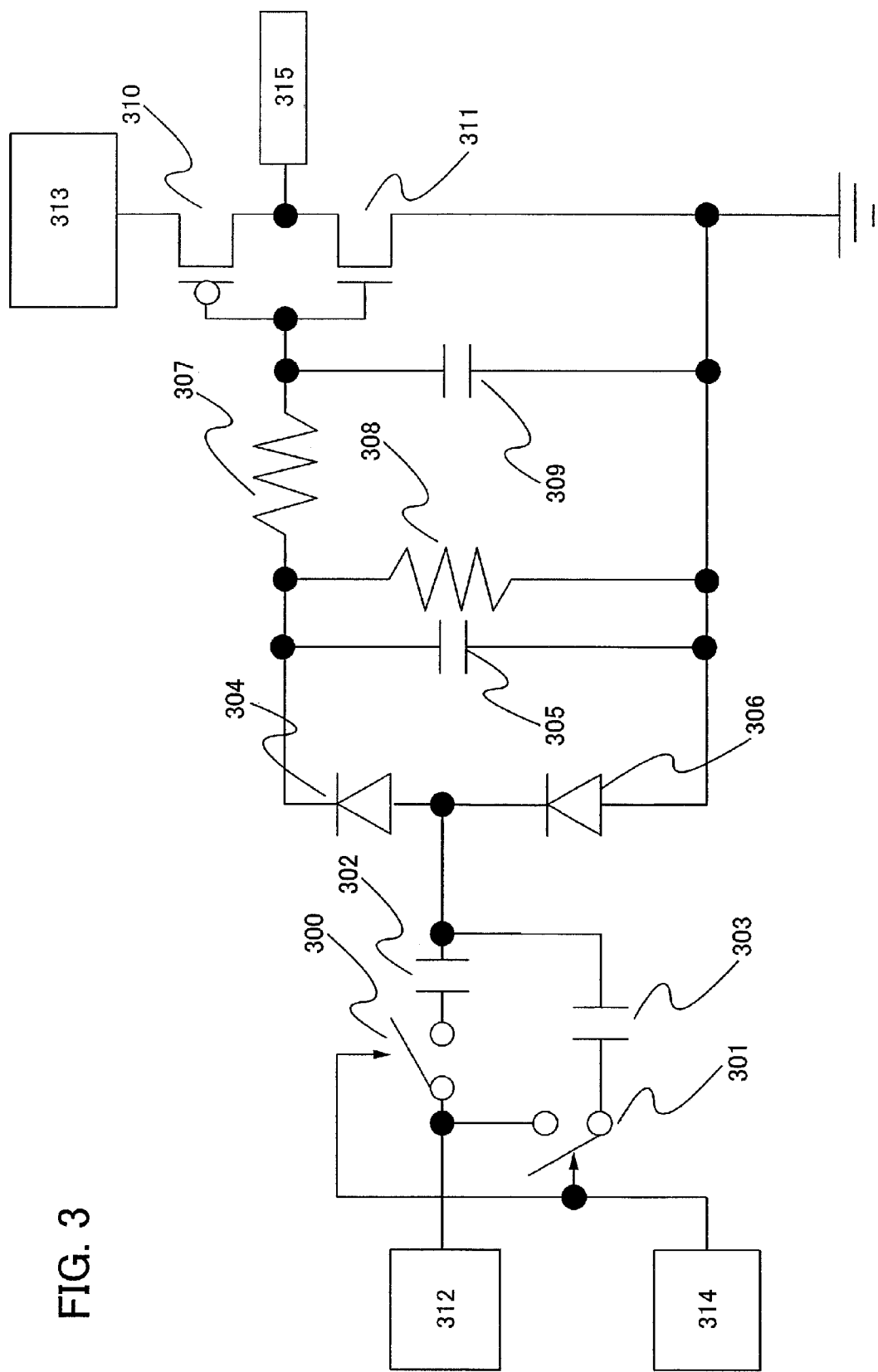
FIG. 3 is a diagram illustrating an example of a demodulation circuit included in a semiconductor device of the present invention.

FIG. 3 shows the demodulation circuit 108 included in the semiconductor device 100 in FIG. 1. The demodulation circuit 108 has a first input portion 312, the second input portion 313, a third input portion 314, a first switch 300, a second switch 301, a first capacitor element 302, a second capacitor element 303, a first diode 304, a second diode 306, a third capacitor element 305, a first resistor element 307, a second resistor element 308, a fourth capacitor element 309, a first transistor 310 (p-type), a second transistor 311 (n-type), and an output portion 315. The first input portion 312 is connected to the output portion 505 of the inductance generation circuit 106. The second input portion 313 is connected to an output portion 209 of the rectifier circuit 107. The third input portion 314 is connected to the output portion 408 of the frequency determining circuit 110. The output portion 315 is connected to the logic circuit 105. The first switch 300 is connected to the first input portion 312 and one terminal of the first capacitor element 302, and turning on or off of the first switch 300 is controlled by the third input portion 314. The second switch 301 is connected to the first input portion 312 and one terminal of the second capacitor element 303, and turning on or off of the second switch 301 is controlled by the third input portion 314. The second capacitor element 303 is connected to the second switch 301 and the other terminal of the first capacitor element 302. The first transistor 310 (p-type) and the second transistor 311 (n-type) configure an inverter. The demodulation circuit 108 demodulates the data of an output signal from the antenna circuit 103.

Figure 4:
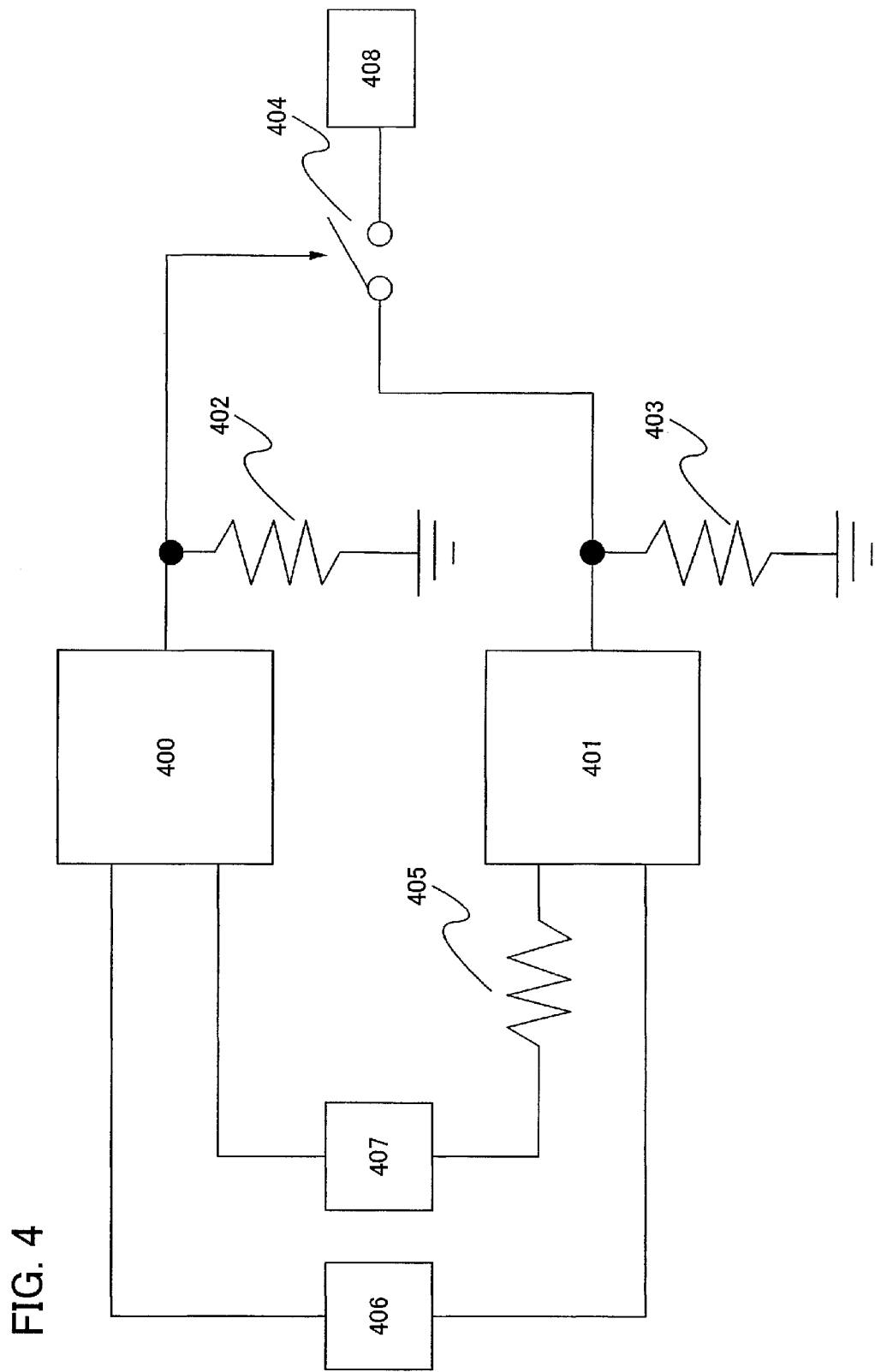
FIG. 4 is a diagram illustrating an example of a frequency determining circuit included in a semiconductor device of the present invention.

FIG. 4 shows the frequency determining circuit 110. The frequency determining circuit determining circuit 110 has the first input portion 406, a second input portion 407, a first comparator 400, a second comparator 401, a first resistor element 402, a second resistor element 403, a switch 404, and a third resistor element 405. The first input portion 406 is connected to the output portion 209 of the rectifier circuit 107. The second input portion 407 is connected to the constant voltage circuit 109. The output portion 408 is connected to a second input portion 504 of the inductance generation circuit 106, the second input portion 208 of the rectifier circuit 107, and the third input portion 314 of the demodulation circuit 108. The first comparator 400 is connected to the first input portion 406 and the second input portion 407. The second comparator 401 is connected to the first input portion 406 and the second input portion 407. The first resistor element 402 is connected to an output portion of the first comparator 400 and a reference potential. The second resistor element 403 is connected to an output portion of second comparator 401 and a reference potential. The switch 404 is connected to an output portion of the second comparator 401 and the output portion 408, and turning on or off of the switch 404 is controlled by the output of first comparator 400.

A potential inputted to the first input portion 406 is a reference potential and is a reference which determines level of a potential of the second input portion 407 that is inputted to the comparator. Specifically, when the potential of the first input portion 406 is higher than the potential of the second input portion 407, the comparator outputs "0". Alternatively, when the potential of the first input portion 406 is lower than the potential of the second input portion 407, the comparator outputs "1".

Note that hereinafter, "1" means the same potential condition as the power supply potential below. "0" means the same potential condition as the reference potential.

The second input portion 407 that is connected to the second comparator 401 inputs a voltage, which is obtained by dividing the input voltage of the second input portion 407 using the third resistor element 405, to the second comparator 401. For example, the voltage divided into ½ or ¼ compared to the voltage of the second input portion 407 which is connected to the first comparator 400 is inputted to the second comparator 401.

Figure 5:
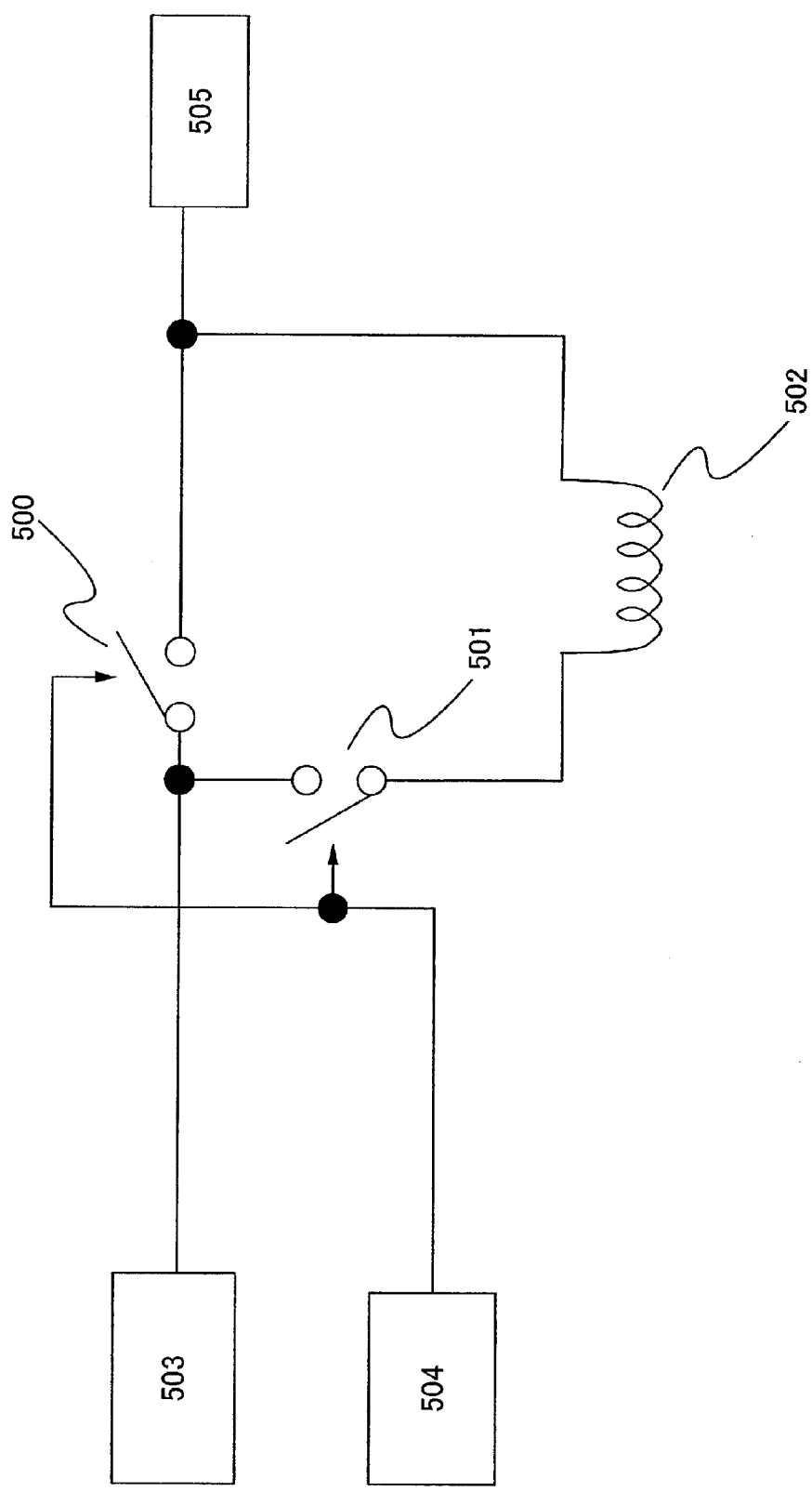
FIG. 5 is a diagram illustrating an example of an inductance generation circuit included in a semiconductor device of the present invention.

FIG. 5 shows the inductance generation circuit 106. The inductance generation circuit 106 has a first switch 500, a second switch 501, a coil 502, a first input 503, the second input portion 504, and the output portion 505. The first input portion 503 is connected to the antenna 103. The second input portion 504 is connected to the output portion 408 of the frequency determining circuit 110. The output portion 505 is connected to the first input portion 207 of the rectifier circuit 107 and the first input portion 312 of the demodulation circuit 108. The first switch 500 is connected to the first input portion 503 and the output portion 505, and turning on or off of the first switch 500 is controlled by the second input portion 504. The second switch 501 is connected to the first input portion 503 and one terminal of the coil 502, and turning on or off of the second switch 501 is controlled by the second input portion 504. The coil 502 is connected to the second switch 501 and the output portion 505.

Note that the coil 502 is formed of a conductive film or the like which has desired a shape and provided in order to adjust inductance. However, the coil 502 is not provided for the purpose of transmitting and receiving a radio signal. Thus, the coil and the antenna do not have large difference essentially; however, it is desirable that the antenna and the coil have different impedances by the difference in the number of windings, the shape, or the like.

Note that the inductance generation circuit may have a plurality of coils without being limited to the form shown in FIG. 5. Such a structure is acceptable that the impedance when the switch 500 turns on is different from the impedance when the second switch 501 turns on.

An operation of the circuit is described next. First a switch is described. When a switch is turned on at "0", a p-type transistor may be used. On or off is controlled by inputting a control signal to a gate of the p-type transistor. When a switch is turned on at "1", an n-type transistor may be used. On or off is controlled by inputting a control signal to a gate of the n-type transistor.

The first switch 200 of the rectifier circuit 107 shown in FIG. 2 has a function that the first switch 200 turns on when the control signal is "0", and the first switch 200 turns off when the control signal is "1". For example, a p-type transistor may be used. The second switch 201 has a function that the second switch 201 turns off when the control signal is "0", and the second switch 201 turns on when the control signal is "1". For example, an n-type transistor may be used. The first capacitor element 202 and the second capacitor element 203 compensate the center (a reference line) of the wave amplitude. Further, the impedance Z is changeable by having the first capacitor element 202 and the second capacitor element 203.

The first switch 300 of the demodulation circuit 108 shown in FIG. 3 has a function that the first switch 300 turns on when the control signal is "0", and the first switch 300 turns off when the control signal is "1". For example, a p-type transistor may be used. The second switch 301 has a function that the second switch 301 turns off when the control signal is "0", and the second switch 301 turns on when the control signal is "1". For example, an n-type transistor may be used. The first capacitor element 302 and the second capacitor element 303 compensate the center (a reference line) of the wave amplitude. Further, the impedance Z is changeable by having the first capacitor element 302 and the second capacitor element 303.

Figure 6:
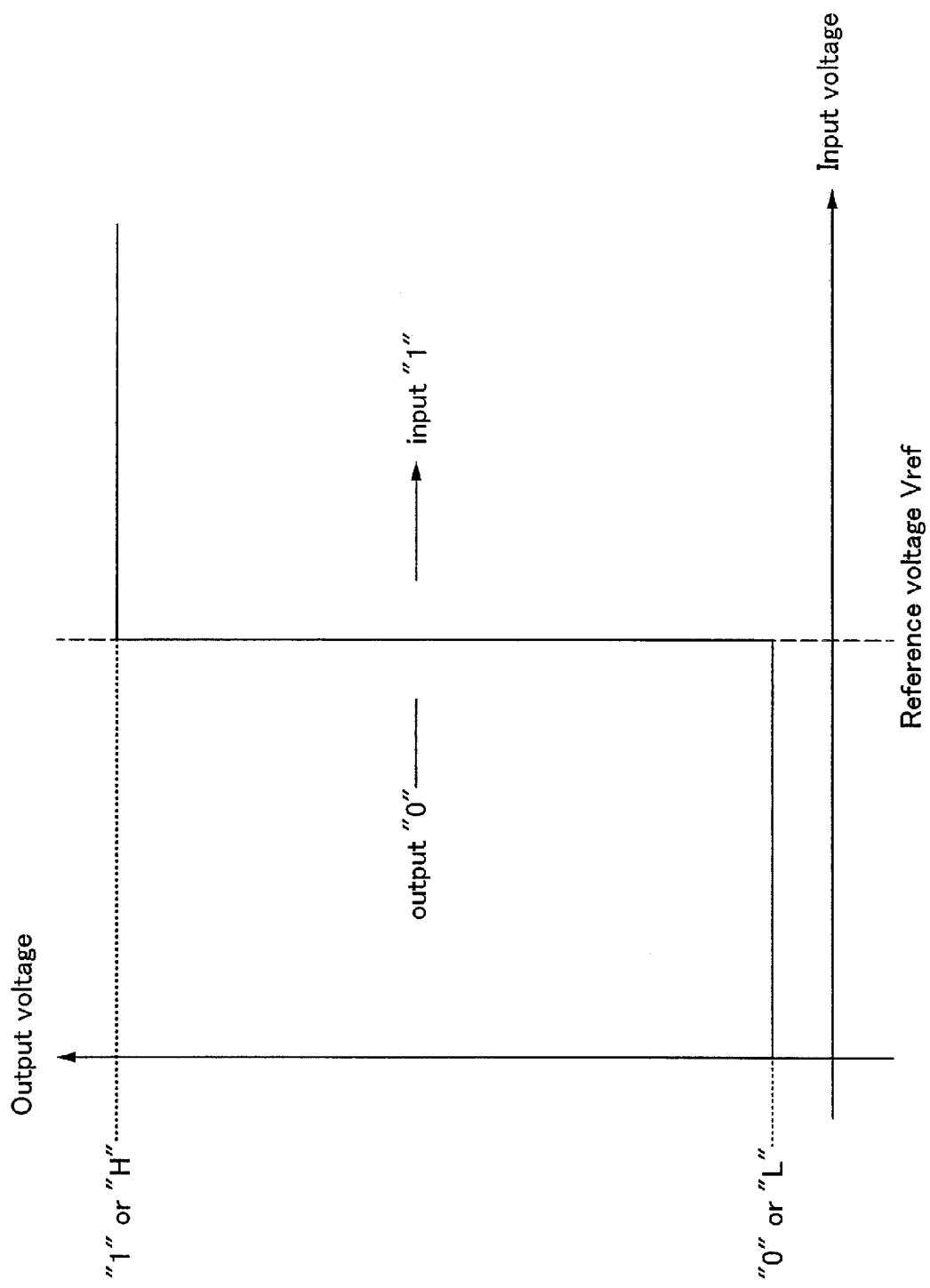
FIG. 6 is a diagram illustrating an example of a comparator included in a semiconductor device of the present invention.

An operation of the first comparator 400 and the second comparator 401 included in the frequency determining circuit 110 shown in FIG. 4 is described next. The output potential of the comparator is shown in FIG. 6 schematically. The comparator compares the potential $V_{in1}$ and potential $V_{in2}$ with reference potential $V_{ref}$ and outputs "0" or "1" in accordance with the result. In other words "1" is output when $V_{ref} < V_{in1}$ or $V_{ref} < V_{in2}$, and "0" is output when $V_{ref} > V_{in1}$ or $V_{ref} > V_{in2}$.

Here, $V_{ref}$, $V_{in1}$ and $V_{in2}$ will be described. $V_{ref}$ is a signal input from the first input portion 406 shown in FIG. 4 and is a reference potential used in the operation of the first comparator 400 and the second comparator 401. $V_{in1}$ is a signal input from the second input portion 407 shown in FIG. 4 and is a signal compared with the reference potential in the operation of the first comparator 400. $V_{in2}$ is a signal obtained by dividing a signal input from the second input 407 shown in FIG. 4 by the third resistor element 405, and is a signal compared with the reference potential in the operation of the second comparator 401.

$V_{ref}$ is inputted to the one of the two input portions of each of the first comparator 400 and the second comparator 401, $V_{in1}$ is inputted to the other input portion of the first comparator 400, $V_{in2}$ is inputted to the other input portion of the second comparator 401. At the time of $V_{in1} > V_{ref}$, the output of the first comparator 400 is "1". At the time of $V_{in1} > V_{ref}$, the output of the second comparator 401 is "1". At the time of $V_{in1} < V_{ref}$, the output of the first comparator 400 is "0". At the time of $V_{in2} < V_{ref}$, the output of the second comparator 401 is "0". The third resistor element 405 is provided to make the potential of $V_{in2}$ different from the potential of $V_{in1}$. The first resistor element 402 and the second resistor element 403 are connected to each comparator for the purpose of supplying an output signal of "0" stably from the first comparator 400 and the second comparator 401 when the output potential is low. The switch 404 employs a p-type transistor, and turns on when a control signal is "0" and turns off when a control signal is "1".

Note that the output portion 408 of the frequency determining circuit 110 is provided with a capacitor element, so that an output signal of the frequency determining circuit 110 can be stabilized. The capacitor element may be provided between the output portion 408 and the switch 404.

FIG. 7 shows an operation of the frequency determining circuit 110 shown in FIG. 4. For simplification, the output of the first comparator 400 is represented as Y (0), and the output of the second comparator 401 is represented as Y (1). A signal of Y (0) is used as a control signal to switch turning on or off of the switch 404. The switch 404 is controlled in accordance with the signal of Y (1).

The output result by the input of the frequency determining circuit 110 is described, with reference to FIG. 7. The case in which frequency band of the received electromagnetic waves is 2.45 GHz and the case in which frequency band of the received electromagnetic waves is 950 MHz are considered. When the electromagnetic waves received from the reader/writer 101 have a frequency band of 950 MHz, and impedance of a circuit is suitable for 950 MHz, and when the electromagnetic waves from the reader/writer 101 have a frequency band of 2.45 GHz, and impedance of a circuit is suitable for 2.45 GHz, the output of the first comparator 400 is "1", because the potential of the first comparator 400 is $V_{ref} < V_{in1}$. The output of second comparator 401 is "1", because the potential of the second comparator 401 is $V_{ref} < V_{in2}$. Thus, the switch 404 turns off, and the output depends on "0" or the last potential.

When the electromagnetic waves from the reader/writer 101 have a frequency band of 2.45 GHz, and impedance of a circuit is suitable for 950 MHz, the output of the first comparator 400 is "0", because the potential of the first comparator 400 is $V_{ref} > V_{in1}$. The output of the second comparator 401 is "1", because the potential of the second comparator 401 is $V_{ref} < V_{in2}$. At that time, the switch 404 turns on, and the output is "1".

When the electromagnetic waves are not received, or when the electromagnetic waves from the reader/writer 101 have a frequency band of 950 MHz, and impedance of a circuit is suitable for 2.45 GHz, the output of the first comparator 400 is "0", because the potential of the first comparator 400 is $V_{ref} > V_{in1}$. The output of the second comparator 401 is "0", because the potential of the second comparator 401 is $V_{ref} > V_{in2}$. At that time the switch 404 turns on, and the output is "0".

FIG. 5 shows the inductance generation circuit 106. The first switch 500 has a structure to turn on when the control signal is "0" and to turn off when the control signal is "1". For example, a p-type transistor may be used. The second switch 501 has a function that the second switch 501 turns on when the control signal is "0", and the second switch 501 turns off when the control signal is "1". For example, an n-type transistor may be used. When the second switch 501 turns on, inductance is generated by the coil 502. Thus, L (inductance) of a circuit is changed depending on turning on or off of the first switch 500 and the second switch 501. Impedance can be controlled using the inductance generation circuit 106 to change the L value in the equation $Z = R + j(\omega L - 1/\omega C)$, which is for obtaining impedance Z.

The above-mentioned circuit operation is summarized as follows; when the electromagnetic waves from the reader/writer 101 have a frequency band of 950 MHz, and impedance of the circuit is suitable for 950 MHz, and when the electromagnetic waves from the reader/writer 101 have a frequency band of 2.45 GHz, and impedance of the circuit is suitable for 2.45 GHz, the frequency determining circuit 110 judges that the electromagnetic waves and the impedance of the circuit are matched, and the potential is retained. When the electromagnetic waves from the reader/writer 101 have a frequency band of 2.45 GHz, and impedance of the circuit is impedance that is suitable for 950 MHz, or when the electromagnetic waves from the reader/writer 101 have a frequency band of 950 MHz, and impedance of the circuit is impedance that is suitable for 2.45 GHz, the frequency determining circuit 110 judges that the impedance of the electromagnetic waves and that of the circuit are not matched. Then, the capacitor element is changed by the rectifier circuit 107 or the demodulation circuit 108, or L (inductance) is changed by the inductance generation circuit 106 so that the electromagnetic waves and impedances of a circuit are adjusted to match.

As described in the embodiment mode above, communication and supplying electric power in a plurality of different frequencies with one antenna can be performed by the present invention. When electromagnetic waves in a plurality of different frequency bands which are different from each other are received, electric power can be supplied using the suitable frequency band by adjusting impedance automatically.

Note that the system described in this embodiment mode is an example, and the present invention is not limited to the above description. For example, the rectifier circuit or the demodulation circuit may have three or more capacitor elements, and the inductance generation circuit may have two or more coils. Alternatively, one capacitor element whose capacitance is adjustable may be provided without providing a plurality of capacitor elements in the rectifier circuit or the demodulation circuit.

Manufacturing a chip having one antenna according to the present invention, the yield is improved and the costs can be reduced because the number of manufacturing steps is reduced, as compared to the case that a plurality of antenna are provided. In addition, the semiconductor device can be reduced in size and weight compared to the case that a plurality of antennas are provided.

Since the number of the antennas of the present invention is one, compression bonding or the like of the antenna can be performed by only one step. Thus, the yield is improved as compared to the case that a plurality of antenna are provided.

Since the best impedance for the antenna can be obtained in accordance with the present invention, a larger amount of electric power can be obtained by supplying power via wireless communication.

[EMBODIMENT MODE 2]

This embodiment mode will describe a system which is different from that in Embodiment Mode 1. In a semiconductor device shown in this embodiment mode, impedance is controlled by adjusting the length of the antenna, so that a communication distance is increased and electric power is obtained at a plurality of the frequency bands. For the convenience, the case that the frequency band is 950 MHz and the case that the frequency band is 2.45 GHz are described below.

Figure 8:
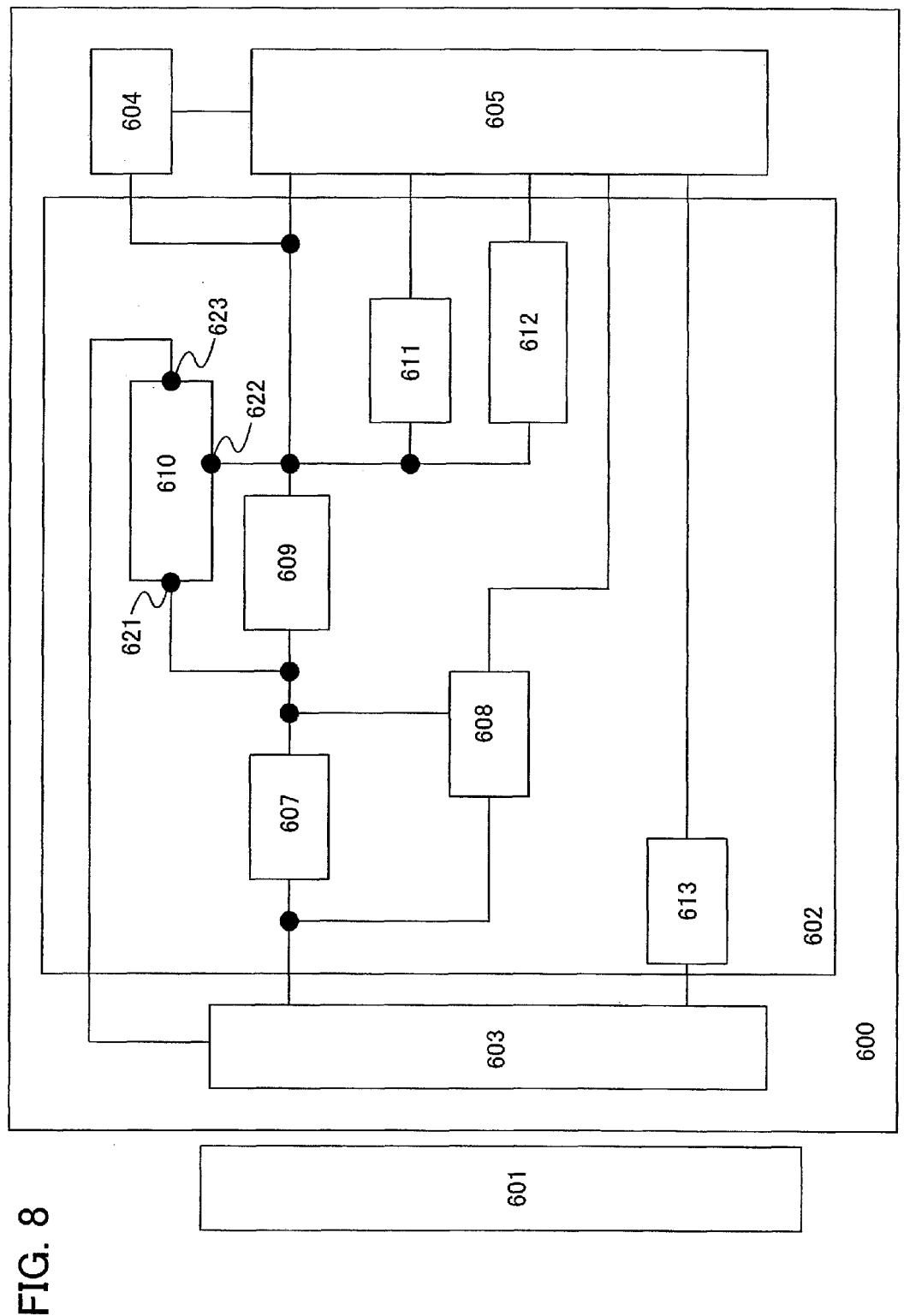
FIG. 8 is a diagram illustrating an example of a semiconductor device of the present invention.
Figure 9:
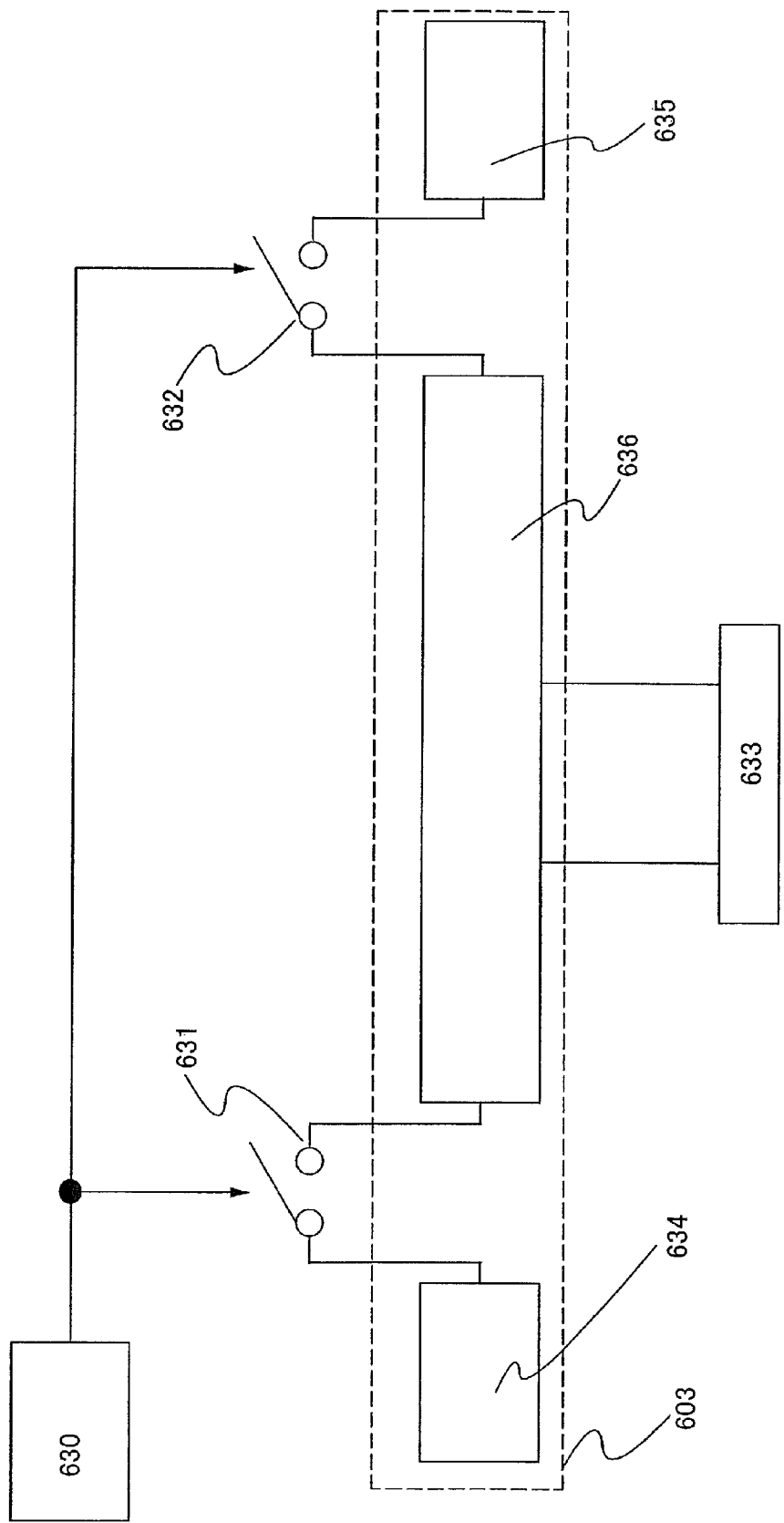
FIG. 9 is a diagram illustrating an example of an antenna included in a semiconductor device of the present invention.

FIG. 8 shows a semiconductor device 600 of this embodiment mode, and FIG. 9 shows an antenna 603 of the semiconductor device 600 of this embodiment mode. The semiconductor device 600 has the antenna 603, an analog circuit 602, a logic circuit 605, and memory circuit 604. The analog circuit 602 has a rectifier circuit 607, a demodulation circuit 608, a modulation circuit 613, a constant voltage circuit 609, a frequency determining circuit 610, an oscillator circuit 611, and a reset generation circuit 612. The semiconductor device 600 transmits and receives data to and from the reader/writer 601 via electromagnetic waves wirelessly. A system such that electric power is supplied to the semiconductor device 600 by the electromagnetic waves transmitted from the reader/writer 601 may be employed. The reader/writer 601 is desirably connected to a computer which controls the reader/writer 601 through a communication line.

Figure 27A:
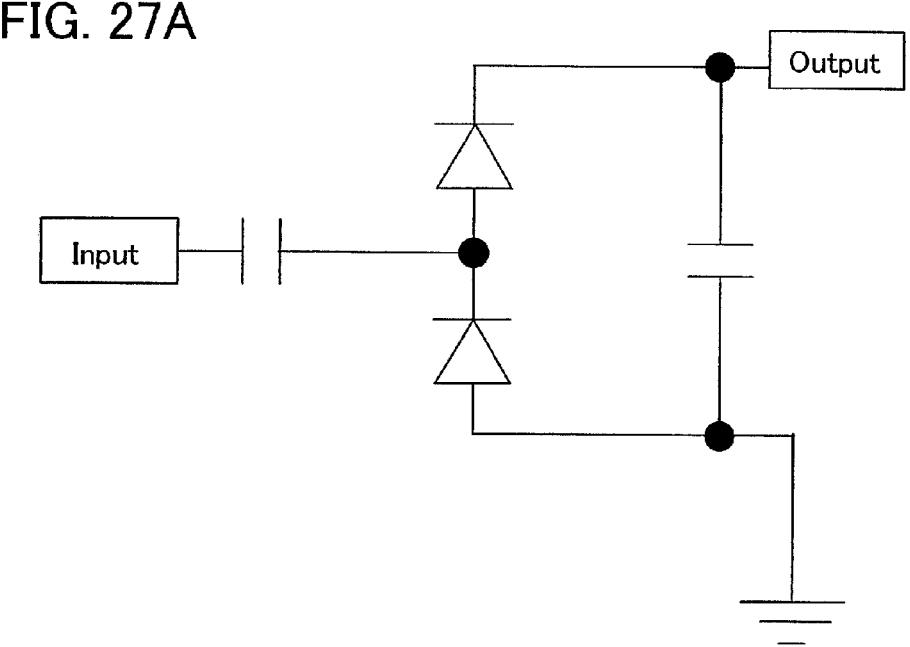
FIGS. 27A and 27B are diagrams illustrating an example of a rectifier circuit and a demodulation circuit of the present invention.
Figure 27B:
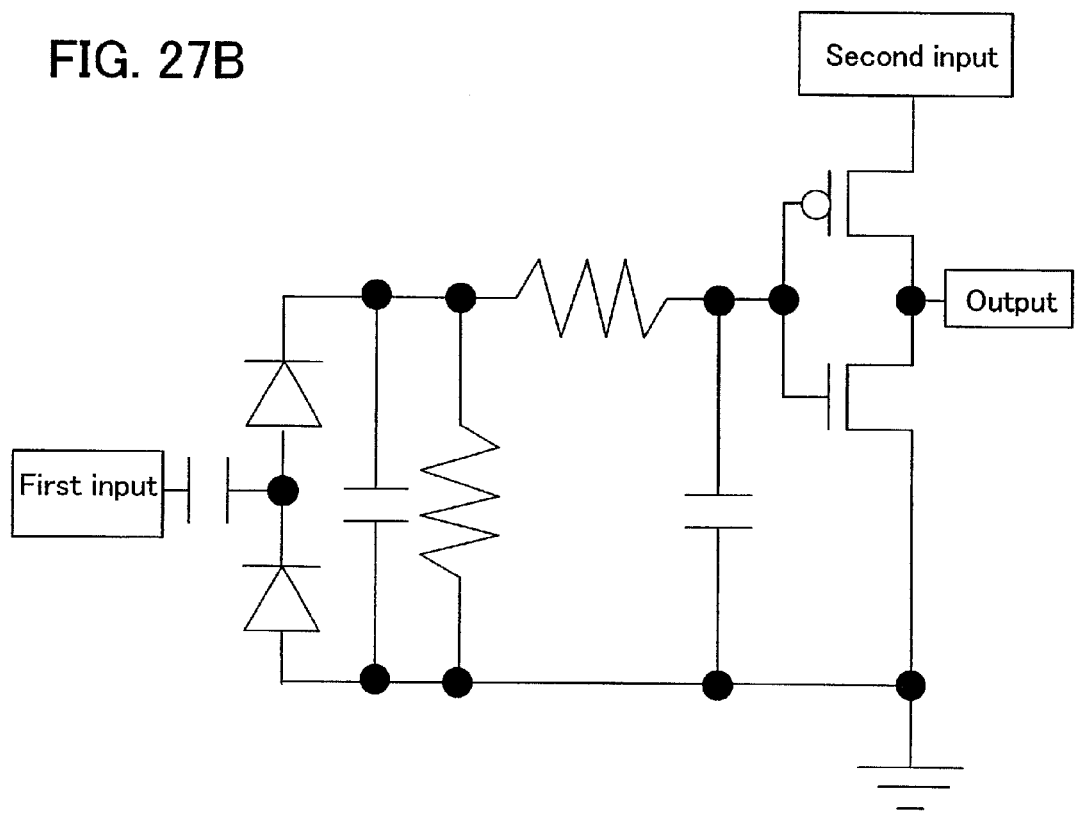

Each circuit configuration of the rectifier circuit 607, the demodulation circuit 608, the modulation circuit 613, the constant voltage circuit 609, the oscillator circuit 611, the reset generation circuit 612, the memory circuit 604, and the logic circuit 605 of the semiconductor device 600 shown in FIG. 8 may use similar configurations to the rectifier circuit 107, the demodulation circuit 108, the modulation circuit 113, the constant voltage circuit 109, the oscillator circuit 111, the reset generation circuit 112, the memory circuit 104, the logic circuit 105, and the like of the semiconductor device 100 described in Embodiment Mode 1. Note that a configuration of the rectifier circuit 607 and the demodulation circuit 608 do not have a first switch, a second switch, and a capacitor element which is connected to the second switch, and may have a component different from that in Embodiment Mode 1. Note that FIGS. 27A and 27B show another form of a rectifier circuit and a demodulation circuit which can be used here. FIG. 27A shows the rectifier circuit 607, and FIG. 27B shows the demodulation circuit 608.

An input of the rectifier circuit 607 is connected to an output portion 633 of the antenna 603, and an output of the rectifier circuit 607 is connected to a second input portion of the demodulation circuit 608, the first input portion 621 of the frequency determining circuit 610, and an input of the constant voltage circuit 609. The first input of the demodulation circuit 608 is connected to the output portion 633 of the antenna 603, the second input portion of the demodulation circuit 608 is connected to an output portion of the rectifier circuit 607, and an output portion of the rectifier circuit 607 is connected to the logic circuit 605. The modulation circuit 613 is connected to an input portion of the antenna 603 and an input portion of the rectifier circuit 607, and the logic circuit 605. The constant voltage circuit 609 is connected to the rectifier circuit 607 and the logic circuit 605. The oscillator circuit 611 is connected to an output portion of the constant voltage circuit 609 and the logic circuit 605. The reset generation circuit 612 is connected to an output portion of the constant voltage circuit 609 and the logic circuit 605. The memory circuit 604 is connected to an output portion of the constant voltage circuit 609 and the logic circuit 605. The logic circuit 605 is connected to the demodulation circuit 608, the modulation circuit 613, and the memory circuit 604.

The frequency determining circuit 610 may use a circuit similar to the frequency determining circuit 110 shown in FIG. 1. The first input portion 621 of the frequency determining circuit 610 is connected to the output portion of the rectifier circuit 607, a second input portion 622 is connected to an output portion of the constant voltage circuit 609, and an output portion 623 is connected to an input portion 630 of the antenna 603.

The antenna 603 which is mounted on the semiconductor device 600 of this embodiment mode is described, with reference to FIG. 8. The semiconductor device 600 generates a power supply voltage and a demodulated signal using the output from the antenna 603. The generated power supply voltage is adjusted to be constant by the constant voltage circuit 609. The demodulation circuit 608 and the modulation circuit 613 are connected to the logic circuit 605. The power supply voltage adjusted to be constant is inputted to the logic circuit 605, the oscillator circuit 611, and the reset generation circuit 612. An output portion of the oscillator circuit 611 is connected to the logic circuit 605. An output portion of the reset generation circuit 612 is connected to the logic circuit 605. Note that the analog circuit 602 may have a limiter circuit or the like in a given position in order to stabilize the operation of the semiconductor device 600, similarly to the semiconductor device 100 of Embodiment Mode 1.

FIG. 9 shows a schematic view of the antenna 603. The antenna 603 has the output portion 633, an antenna main portion 636, an antenna end 634, and an antenna end 635, and is connected to the input portion 630 and the output portion 633. In addition, the antenna main portion 636, the antenna end 634, and the antenna end 635 are connected via a first switch 631 and a second switch 632. Turning on or off of the first switch 631 and the second electric switch 632 is controlled by a signal output from the input portion 630. The second switch 632 and the antenna end 635 are not provided when they are not needed.

An operation of antenna 603 of FIG. 9 will be described. The first switch 631 and the second electric switch 632 turn on when a control signal is "0" and turn off when a control signal is "1". For example, a p-type transistor can be used as the first switch 631 and the second electric switch 632. Impedance of the antenna can be adjusted by the change of the length of the antenna by turning on or off of the first switch 631 and the second switch 632 by the output portion 623 of the frequency determining circuit 610. When both the first switch 631 and the second switch 632 are off, the antenna main portion 636, the antenna end 634, and the antenna end 635 are not connected. Here, when the first switch 631 turns on, the antenna main portion 636 and the antenna end 634 are connected. When the second switch 632 turns on, the antenna main portion 636 and the antenna end 635 are connected.

The relationships when impedances are matched and not matched are the same as the description in the Embodiment Mode 1.

The above-mentioned circuit operation is summarized as follows: when the electromagnetic waves from the reader/writer 601 have a frequency band of 950 MHz, and impedance of the antenna 603 is suitable for 950 MHz, or when the electromagnetic waves from the reader/writer 601 a frequency band of 2.45 GHz, and impedance of the antenna 603 is suitable for 2.45 GHz, the frequency determining circuit 610 judges that the electromagnetic waves and the impedance of a circuit are matched, and the condition is retained. When the electromagnetic waves from the reader/writer 601 have a frequency band of 2.45 GHz, and impedance of the antenna 603 is suitable for 950 MHz, or when the electromagnetic waves from the reader/writer 601 have a frequency band of 950 MHz, and impedance of the antenna 603 is suitable for 2.45 GHz, the frequency determining circuit 610 judges the electromagnetic waves and the impedance of a circuit are not matched. Then, the length of the antenna 603 is changed by turning on or off of the first switch 631 or the second switch 632 so as to match the electromagnetic waves from the reader/writer 601 and the impedance an antenna. Impedance is adjusted by controlling connection or disconnection of the antenna main portion 636, and the antenna end 634 or the antenna end 635 included in the antenna 603. Alternatively, a capacitor element of the rectifier circuit 607 and the demodulation circuit 608 may be switched in the semiconductor device 600, as described in Embodiment Mode 1. Further, impedance may be controlled using the semiconductor device 600 provided with an inductance generation circuit which is described in Embodiment Mode 1.

In addition, the antenna 603 may be an on-chip antenna which is formed on an element formed using a thin film transistor included in the semiconductor device 600. FIGS. 25A to 25D show the case that the antenna 603 is an on-chip antenna.

Figure 25A:
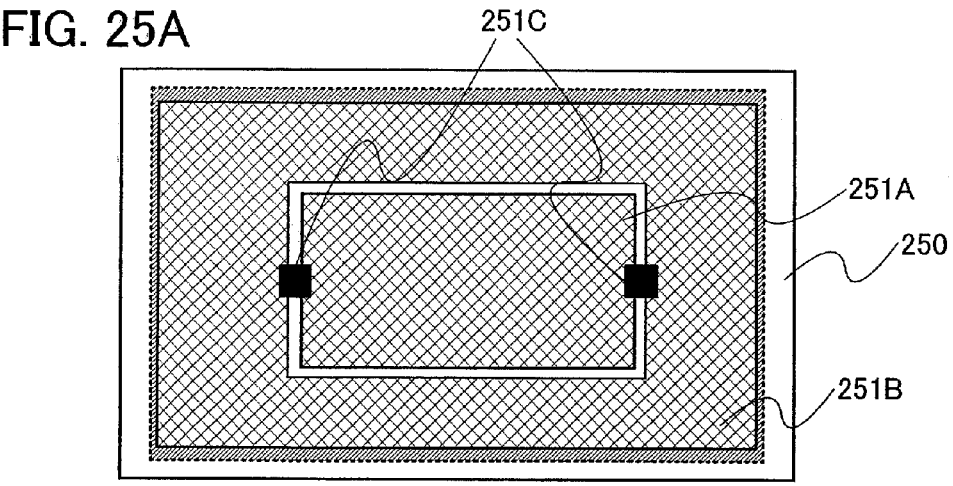
FIG. 25A to 25D are diagrams illustrating examples of a shape of an antenna of the present invention.
Figure 25B:
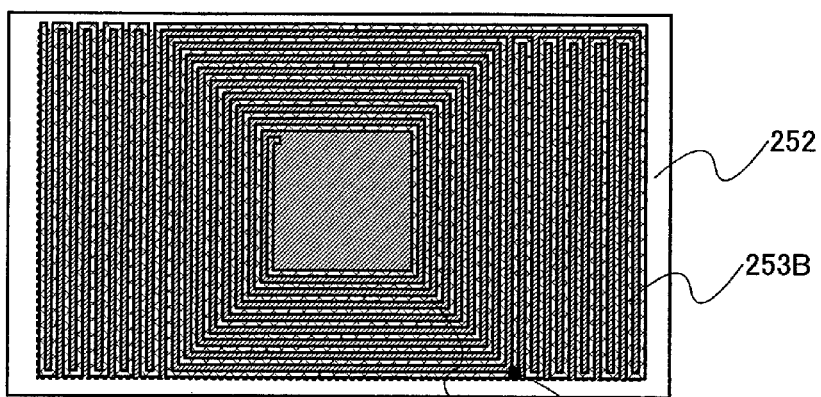
Figure 25C:
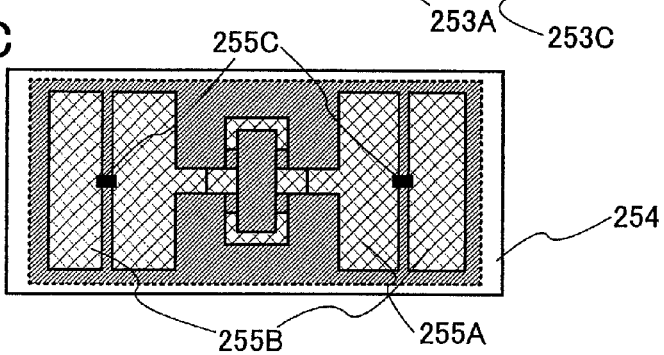
Figure 25D:
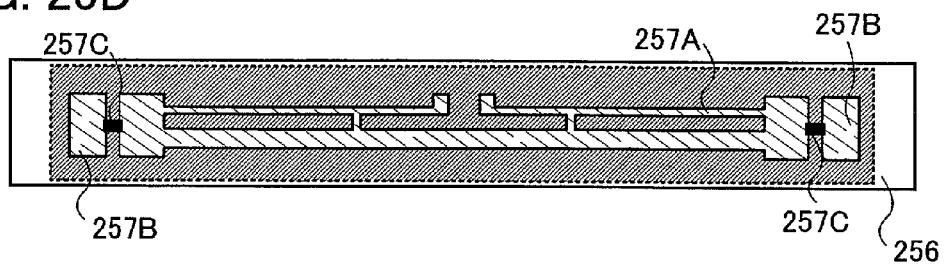

Here, FIG. 25A to 25D show an exemplary shape of the antenna 603 that is an on-chip antenna. For example, as shown in FIG. 25A, a structure may be employed that an chip 250 including a signal processing circuit is provided with an antenna comprising an antenna main portion 251A and an antenna end 251B over the entire face. The antenna main portion 251A and the antenna end 251B are connected via a switch 251C, and the size of the antenna changes by turning on or off of the switch 251C, so that impedance changes. In addition, as shown in FIG. 25B, a structure may be employed that a thin antenna comprising an antenna main portion 253A and an antenna end 253B is provided over the entire face of a chip 252 provided with a signal processing circuit. In FIG. 25B, the antenna main portion 253A and the antenna end 253B are connected via a switch 253C, and the size of the antenna changes by turning on or off of the switch 253C, so that impedance changes. In addition, as shown in FIG. 25C, an antenna may have an H shape with a chip 254 provided with a signal processing circuit at the center. In FIG. 25C, the antenna main portion 255A and the antenna end 255B are connected via a switch 255C, and the size of the antenna changes by turning on or off of the switch 255C, so that impedance changes. Note that the antenna of FIG. 25C is suitable for reception of the electromagnetic waves with a high frequency. In addition, as shown in FIG. 25D, a chip 256 having a signal processing circuit may be provided with an antenna which is extended in a stick shape. In FIG. 25D, an antenna main portion 257A and an antenna end 257B are connected via a switch 257C, and the size of the antenna changes by turning on or off of the switch 257C. The antenna 603 may have a shape obtained by combining these shapes.

Figure 26A:
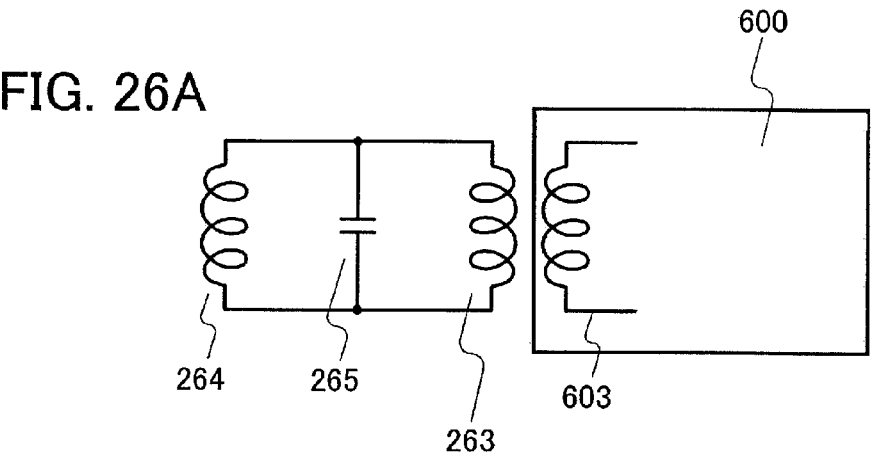
FIG. 26A to 26C are diagrams illustrating structural examples of an antenna of the present invention.
Figure 26B:
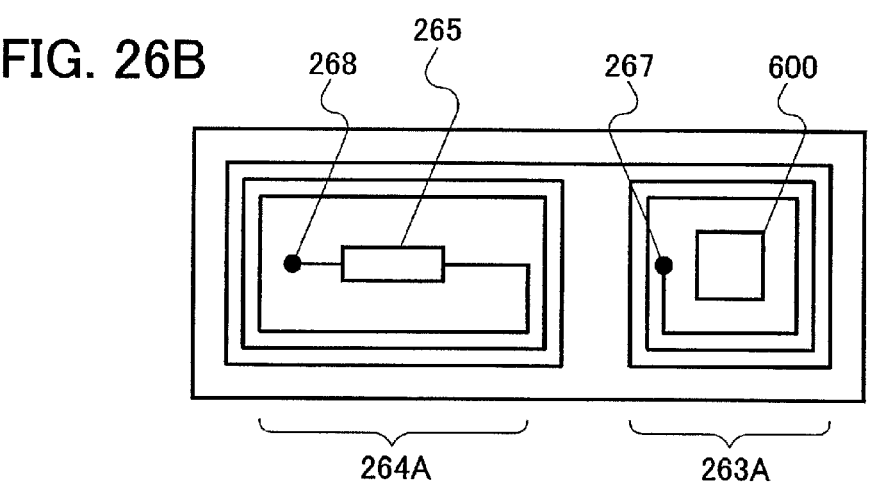
Figure 26C:
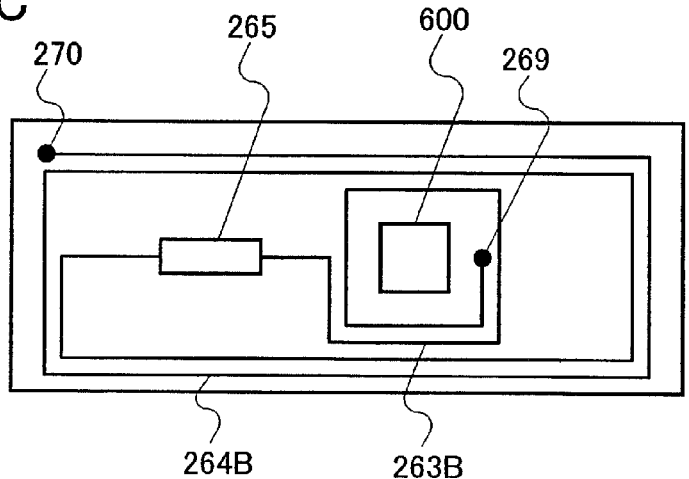

When an on-chip antenna is used as shown in FIG. 25A to 25D, it is desirable to have a structure which increases the communication distance. FIGS. 26A to 26C show an exemplary structure of an antenna having a structure in order to increase a communication distance. FIG. 26A is a circuit diagram illustrating the relationship between the semiconductor device 600 and the antenna of reader/writer 601. In a structure shown in FIG. 26A, the semiconductor device 600 has a second antenna 263, a third antenna 264, and a capacitor element 265 in addition to the antenna 603. These may be made separately from the semiconductor device 600, and attached to the semiconductor device 600.

When a communication signal from the reader/writer 601 is received with the third antenna 264, induced electromotive force due to electromagnetic induction is generated at the third antenna 264. By the induced electromotive force, an induction field is generated from the second antenna 263. The induced electromotive force by electromagnetic induction is generated at the antenna 603 by receiving the induction field with the antenna 603.

Here, the induction field which the antenna 603 receives can be increased by increasing inductance of the third antenna 264. In other words, even if the inductance of the antenna 603 is small, the induction field which is sufficient to operate semiconductor device 600 can be supplied. When the antenna 603 is formed as an on-chip antenna, the inductance thereof can not be increased very much because the area of the semiconductor device 600 is small. Therefore, it is difficult to increase the communication distance of the semiconductor device 600 using only the antenna 603. However, by applying the structure described in FIG. 26A, the communication distance can be increased.

FIG. 26B is a diagram which illustrates an exemplary layout of the antenna provided in the semiconductor device 600 of this embodiment mode. In FIG. 26B, a second antenna 263A is outside of a third antenna 264A. A first through-hole 267 and a second through-hole 268 are electrically connected to each other. The second antenna 263A, the third antenna 264A, and the capacitor element 265 form an external antenna. As the capacitor element 265, a chip capacitor, a film capacitor, or the like can be used. An antenna with a narrow width can be formed by employing the layout shown in FIG. 26B. Accordingly, the layout is effective when the width of the semiconductor device 600 is narrow.

FIG. 26C is a diagram which illustrates an exemplary layout of the antenna of the semiconductor device 600 of this embodiment mode. In FIG. 26C, a second antenna 263B is inside a third antenna 264B. A first through-hole 269 and a second through-hole 270 are electrically connected to each other. The second antenna 263B, the third antenna 264, and the capacitor element 265 form an external antenna. As the capacitor element 265, a chip capacitor, a film capacitor, or the like can be used. An antenna with a narrow width can be formed by employing the layout shown in FIG. 26C. Accordingly, the layout is effective when the width of the semiconductor device 600 is narrow. The communication distance of the semiconductor device 600 can be increased.

Note that a transistor can be used for a switch (for example, the first switch 631 and the second switch 632) which is connected to the antenna. A transistor which serves as a switch connected to the antenna may be made in the same step as the transistor included in a chip.

As described in the embodiment mode above, communication and supplying electric power in a plurality of different frequencies with one antenna can be performed by the present invention. When electromagnetic waves in a plurality of different frequency bands which are different from each other are received, electric power can be supplied using the suitable frequency band by adjusting impedance automatically.

Manufacturing a chip having one antenna according to the present invention, the yield is improved and the costs can be reduced because the number of manufacturing steps is reduced, as compared to the case that a plurality of antenna are provided. In addition, the semiconductor device can be reduced in size and weight compared to the case that a plurality of antennas are provided.

Since the number of the antennas of the present invention is one, compression bonding or the like of the antenna can be performed by only one step. Thus, the yield is improved as compared to the case that a plurality of antenna are provided.

Since the best impedance for the antenna can be obtained in accordance with the present invention, a larger amount of electric power can be obtained by supplying power via wireless communication.

In addition, this embodiment mode and Embodiment Mode 1 can be combined.

[EMBODIMENT MODE 3]

This embodiment mode will describe a semiconductor device of the present invention which has a different mode from that in the Embodiment Mode 1. Specifically, the semiconductor device described in Embodiment Mode 1 is provided with a battery.

Figure 10:
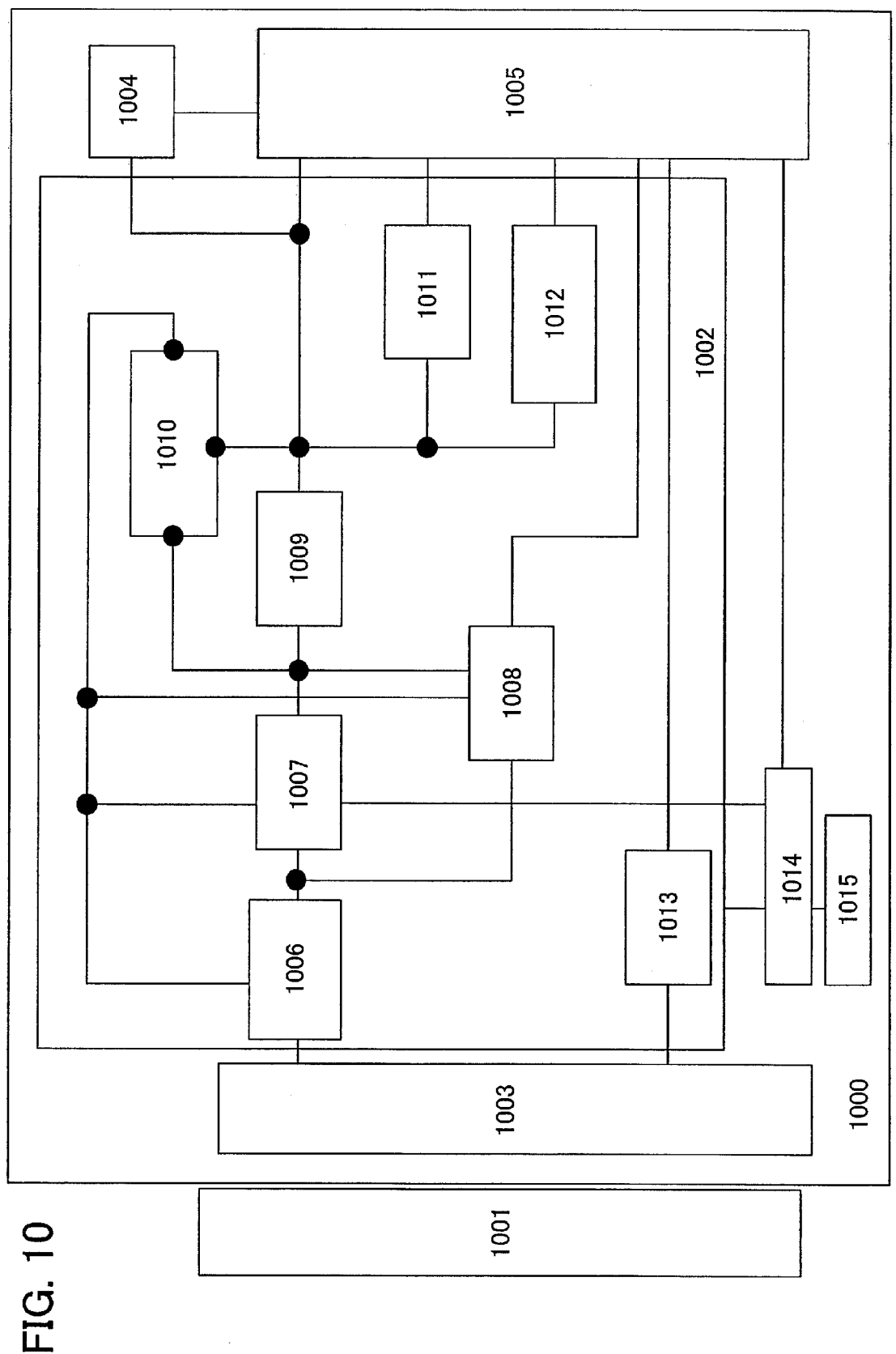
FIG. 10 is a diagram illustrating an example of a semiconductor device of the present invention.

FIG. 10 is a block diagram of a semiconductor device of this embodiment mode. A semiconductor device 1000 of this embodiment mode transmits and receives data to and from a reader/writer 1001 wirelessly via the electromagnetic waves. The reader/writer 1001 is desirably connected to a control device via a communication line. The control device has at least a function of controlling communication between the reader/writer 1001 and the semiconductor device 1000.

Further, electric power is supplied from the reader/writer 1001 to the semiconductor device 1000 wirelessly.

The semiconductor device 1000 has an antenna 1003, a charging and discharging circuit 1014, a battery 1015, an analog circuit 1002, a logic circuit 1005, and a memory circuit 1004. The analog circuit 1002 has a modulation circuit 1013, an inductance generation circuit 1006, a rectifier circuit 1007, a constant voltage circuit 1009, a frequency determining circuit 1010, an oscillator circuit 1011, and a reset generation circuit 1012. That is, the system is that the charging and discharging circuit 1014 and the battery 1015 are provided in the semiconductor device 100 described in Embodiment Mode 1.

The antenna 1003, the analog circuit 1002, the logic circuit 1005, and memory circuit 1004 of the semiconductor device 1000 may be similar to those configuration described in Embodiment Mode 1 and Embodiment Mode 2. In addition, the semiconductor device 1000 of the present invention may have an inductance generation circuit, and the configuration of a rectifier circuit and a demodulation circuit described in Embodiment Mode 1 may be employed. Further, as described in Embodiment Mode 2, an antenna whose length is changeable may be used for the antenna 1003, the antenna 1003 may be an on-chip antenna, or may have an external antenna for increasing the communication distance.

Note that a shape and connection method similar to those of the antenna of the semiconductor device 100 in Embodiment Mode 1, which is illustrated in FIGS. 24A to 24D may be used for the antenna 1003.

A signal demodulated in the demodulation circuit 1008 is inputted into the logic circuit 1005, individual identification information (ID) or the like stored in the memory circuit 1004 is extracted by the logic circuit 1005, the extracted information is encoded in the logic circuit 1005, and is inputted to the modulation circuit 1013. The modulation circuit 1013 modulates the information in accordance with the signal input, and the information is transmitted from the antenna 1003 to the reader/writer 1001. The information received at the reader/writer 1001 is transmitted to the control device.

As described above, the semiconductor device 1000 shown in FIG. 10 is different from the semiconductor device 100 shown in FIG. 1 greatly in that the semiconductor device 1000 includes the battery 1015 and the charging and discharging circuit 1014. The battery 1015 is connected to the charging and discharging circuit 1014, and the charging and discharging circuit 1014 is connected to a second output portion of the rectifier circuit 1007, the analog circuit 1002, and the logic circuit 1005. Note that the second output portion to which the charging and discharging circuit 1014 is connected may be provided separately from a first output portion of the charging and discharging circuit 1014 as shown in FIG. 10, the first input portion and the second input portion are connected to each other to be one output portion.

The battery 1015 is charged with the electromagnetic waves which are inputted to the antenna 1003 by the external radio signal input from the antenna 1003 via the rectifier circuit 1007, and electric power can be supplied to each circuit using electric power stored in the battery 1015 via the charging and discharging circuit 1014. When enough electric power can not be obtained from the antenna 1003 of the semiconductor device 1000 in the case of increased the communications distance, electric power can be supplied to the semiconductor device 1000 and the semiconductor device 1000 can be operated using electric power which is stored in the battery 1015. Accordingly, the operation of a semiconductor device of the present invention can be more stable.

Note that a battery provided in the present invention means a storage battery whose continuous operating time can be restored by charging. As a battery, a battery formed into a sheet-like form is preferably used, and miniaturization of a battery is possible by using, for example, a lithium battery, preferably a lithium polymer battery that uses a gel electrolyte, a lithium ion battery, or the like. Needless to say, any battery may be used as long as it is chargeable, for example, chargeable or dischargeable batteries such as a nickel metal hydride battery, a nickel cadmium battery or the like, or a high-capacity capacitor may be used. It is desirable to use a wirelessly chargeable battery.

Since the semiconductor device of this embodiment mode includes the battery, shortage of electric power for transmitting and receiving individual information in accordance with degradation of a battery with the passage of time can be compensated. In particular, since the semiconductor device of the present invention includes a comparator which consumes large amount of electric power, providing a battery is very effective as described in this embodiment mode.

The semiconductor device of this embodiment mode may include a plurality of antennas for supplying electric power to the battery wirelessly. Therefore, the battery which supplies electric power for driving the semiconductor device can be charged with electromagnetic waves from the outside without being directly connected to a charger. As a result, continuously use of the semiconductor device for a long time and term is possible without check of remaining capacity of a battery or replacement of the battery, like the conventional active type RFID tag. In addition, electric power for driving the semiconductor device is always retained in the battery, whereby electric power which is enough for an operation of the semiconductor device can be obtained and the communication distance between the semiconductor device and the reader/writer can be increased.

Note that although a battery is described as an example of the power storage portion in this embodiment mode, the semiconductor device can be configured using a capacitor instead of the battery. Various types of capacitors can be used. An electric double layer capacitor or a laminated ceramic capacitor, which is small and has large capacitance is preferably used in particular. In addition, both a battery and a capacitor may be provided as the power storage portion.

As described in the embodiment mode above, communication and supplying electric power in a plurality of different frequencies with one antenna can be performed by the present invention. In addition, when electromagnetic waves in a plurality of different frequency bands which are different from each other are received, electric power can be supplied by adjusting the suitable frequency band by matching impedance automatically.

Manufacturing a chip having one antenna according to the present invention, the yield is improved and the costs can be reduced because the number of manufacturing steps is reduced, as compared to the case that a plurality of antenna are provided. In addition, the semiconductor device can be reduced in size and weight compared to the case that a plurality of antennas are provided.

Since the number of the antennas of the present invention is one, compression bonding or the like of the antenna can be performed by only one step. Thus, the yield is improved as compared to the case that a plurality of antenna are provided.

Since the best impedance for the antenna can be obtained by the present invention, a larger amount of electric power can be obtained by supplying power via wireless communication. When a battery which is chargeable by wireless as the battery 1015 of the semiconductor device 1000 in this embodiment mode in particular, charging efficiency increases for adjusting to the suitable impedance in accordance with the frequency to receive.

Note that this embodiment mode can be optionally combined with any of the embodiment modes in this specification. That is, the case that a battery is included in the semiconductor device 100 of Embodiment Mode 1 is described in the above description, but a mode in which a battery is included in the semiconductor device 600 of Embodiment Mode 2 may be employed.

[EMBODIMENT MODE 4]

In this embodiment mode, one example of a manufacturing method of a semiconductor device described in Embodiment Mode 1 will be described with reference to drawings. In this embodiment mode, a composition in which an antenna, a battery, and a signal processing circuit in a semiconductor device are provided over the same substrate using a thin film transistor will be described. Note that because the antenna, the battery, and the signal processing circuit are formed over one substrate, miniaturization of a semiconductor device can be achieved. In addition, an example in which a thin film secondary battery is used for the battery is described.

First, a separation layer 703 is formed over one surface of a substrate 701 with an insulating film 702 therebetween. Next, an insulating film 704 which serves as a base film and an amorphous semiconductor film 705 (e.g., a film which includes amorphous silicon) are stacked (see FIG. 11A). Note that the insulating film 702, the separation layer 703, the insulating film 704, and the amorphous semiconductor film 705 can be formed in succession. Note that the separation layer 703 does not need to be formed when separation process is not required.

The substrate 701 may be a glass substrate, a quartz substrate, a metal substrate (e.g. a ceramic substrate, a stainless steel substrate, or the like), a semiconductor substrate such as a Si substrate, or the like. Alternatively, a plastic substrate formed of polyethylene terephthalate (PET), polyethylene naphthalate (PEN), polyether sulfone (PES), acrylic, or the like can be used. Note that in this step, the separation layer 703 is provided over an entire surface of the substrate 701 with the insulating film 702 therebetween; however, if necessary, a pattern may be formed by a photolithography method after providing the separation layer over the entire surface of the substrate 701.

The insulating film 702 and the insulating film 704 are formed using an insulating material such as silicon oxide, silicon nitride, silicon oxynitride ($SiO_xN_y$, where x>y>0), or silicon nitride oxide ($SiN_xO_y$, where x>y>0), by a CVD method, a sputtering method, or the like. For example, when the insulating film 702 and the insulating film 704 have a two-layer structure, preferably a silicon nitride oxide film is formed as a first insulating film and a silicon oxynitride film is formed as a second insulating film. Alternatively, a silicon nitride film may be formed as a first insulating film and a silicon oxide film may be formed as a second insulating film. The insulating film 702 serves as a blocking layer which prevents an impurity element from the substrate 701 from being mixed into the separation layer 703 or an element formed thereover. The insulating film 704 serves as a blocking layer which prevents an impurity element from the substrate 701 or the separation layer 703 from being mixed into an element formed thereover. By forming the insulating films 702 and 704 which serve as blocking layers in this manner, an element formed thereover can be prevented from being adversely affected by an alkali metal such as sodium or an alkali earth metal included in the substrate 701, or an impurity element included in the separation layer 703. Note that when quartz is used as the substrate 701, the insulating films 702 and 704 may be omitted from the structure. This is because an alkali metal and an alkali earth metal are not included in the quartz substrate.

As the separation layer 703, a metal film, a stacked-layer structure including a metal film and a metal oxide film, or the like can be used. As the metal film, a single-layer structure or a stacked-layer structure is formed using a film formed of any of the elements such as tungsten, molybdenum, titanium, tantalum, niobium, nickel, cobalt, zirconium, zinc, ruthenium, rhodium, palladium, osmium, and iridium, or of an alloy material or a compound material containing such an element as a main component. These materials can be formed by using a sputtering method, various CVD methods, such as a plasma CVD method, or the like. As the stacked-layer structure including a metal film and a metal oxide film, after the aforementioned metal film is formed, plasma treatment in an oxygen atmosphere or an N$_2$O atmosphere, or heat treatment in an oxygen atmosphere or an N$_2$O atmosphere is performed, so that an oxide or an oxynitride of the metal film can be formed on a surface of the metal film. For example, when a tungsten film is formed as the metal film by a sputtering method, a CVD method, or the like, plasma treatment is performed on the tungsten film so that a metal oxide film formed of tungsten oxide can be formed on a surface of the tungsten film. Alternatively, for example, after a metal film (e.g., a tungsten film) is formed, an insulating film may be formed over the metal film using silicon oxide (SiO$_2$) or the like by a sputtering method, whereby a metal oxide film may be formed on the metal film (e.g., a tungsten oxide film on the tungsten film). Further, for example, high-density plasma treatment as described above may be performed as plasma treatment. Furthermore, in addition to the metal oxide film, a metal nitride or a metal oxynitride film may be used. In this case, the metal film may be subjected to plasma treatment or heat treatment in a nitrogen atmosphere or an atmosphere where nitrogen and oxygen are mixed.

The amorphous semiconductor film 705 is formed with a thickness of 10 to 200 nm, inclusive (preferably, 30 to 150 nm, inclusive) by a sputtering method, an LPCVD method, a plasma CVD method, or the like.

Next, the amorphous semiconductor film 705 is crystallized by being irradiated with laser light. The amorphous semiconductor film 705 may be crystallized by a method which combines laser light irradiation with a thermal crystallization method which employs rapid thermal annealing (RTA) or an annealing furnace or a thermal crystallization method which employs a metal element for promoting crystallization, or the like. Subsequently, the obtained crystalline semiconductor film is etched into a desired shape to form crystalline semiconductor films 705a to 705f, and a gate insulating film 706 is formed so as to cover the crystalline semiconductor films 705a to 705f (see FIG. 11B). Note that it is preferable that end portions of the crystalline semiconductor films are etched such that the end portions have a tapered shape. With the tapered shape, the gate insulating film is favorably formed.

Note that the gate insulating film 706 is formed using an insulating material such as silicon oxide, silicon nitride, silicon oxynitride (SiO$_x$N$_y$, where x>y>0), or silicon nitride oxide (SiN$_x$O$_y$, where x>y>0), by a CVD method, a sputtering method, or the like. For example, when the gate insulating film 706 has a two-layer structure, preferably a silicon oxynitride film is formed as a first insulating film and a silicon nitride oxide film is formed as a second insulating film. Alternatively, a silicon oxide film may be formed as the first insulating film and a silicon nitride film may be formed as the second insulating film.

Next, an example of a manufacturing step of the crystalline semiconductor films 705a to 705f is briefly described below. First, an amorphous semiconductor film with a thickness of 50 to 60 nm is formed by a plasma CVD method. Next, a solution containing nickel, which is a metal element for promoting crystallization, is retained on the amorphous semiconductor film, and then dehydrogenation treatment (at 500° C., for one hour) and thermal crystallization treatment (at 550° C., for four hours) are performed on the amorphous semiconductor film to form a crystalline semiconductor film. Subsequently, the crystalline semiconductor film is irradiated with laser light, and etched by a photolithography method, so that the crystalline semiconductor films 705a to 705f are formed. Note that the amorphous semiconductor film may be crystallized just by laser light irradiation, without performing thermal crystallization which employs a metal element for promoting crystallization. Note that a single crystal semiconductor film may be employed without limitation to a polycrystalline semiconductor film.

As a laser oscillator used for crystallization, either a continuous wave laser beam (a CW laser beam) or a pulsed laser beam can be used. As a laser beam that can be used here is one or more of the followings: gas lasers such as an Ar laser, a Kr laser, and an excimer laser; a laser using, as a medium, single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ which is doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. When irradiation is performed with the fundamental wave of such a laser beam or the second to fourth harmonics of the fundamental wave, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of approximately 0.01 to 100 MW/cm$^2$ (preferably, 0.1 to 10 MW/cm$^2$, inclusive) is needed, and irradiation is performed at a scanning rate of approximately 10 to 2000 cm/sec. Note that the laser using, as a medium, single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ which is doped with one or more of Nd, Yb, Cr, Ti, Ho, Er, Tm, and Ta as a dopant; an Ar ion laser; or a Ti:sapphire laser can perform continuous oscillation, whereas it can also be used as a pulsed laser at a repetition rate of 10 MHz or more by conducting a Q-switch operation, mode locking, or the like. When a laser beam is oscillated at a repetition rate of 10 MHz or more, a semiconductor film is irradiated with a laser of the next pulse during the period in which the semiconductor film is melted by the previous laser beam and solidified. Therefore, unlike the case of using a pulsed laser with a low repetition rate, a solid-liquid interface in the semiconductor film can be continuously moved. Thus, crystal grains grown continuously in the scanning direction can be obtained.

Further, the foregoing high-density plasma treatment may be performed on the crystalline semiconductor films 705a to 705f to oxidize or nitride surfaces thereof, to form the gate insulating film 706. For example, the gate insulating film 706 is formed by a plasma treatment in which a mixed gas which contains a rare gas such as He, Ar, Kr, or Xe, and oxygen, nitrogen oxide, ammonia, nitrogen, hydrogen, or the like, is introduced. When excitation of the plasma in this case is performed by introduction of microwaves, plasma with a low electron temperature and a high density can be generated. The surface of the semiconductor film can be oxidized or nitrided by oxygen radicals (OH radicals may be included) or nitrogen radicals (NH radicals may be included) generated by this high-density plasma.

By treatment using such high-density plasma, an insulating film with a thickness of 1 to 20 nm, inclusive, typically 5 to 10 nm, inclusive, is formed over the semiconductor film. Because the reaction in this case is a solid-phase reaction, interface state density between the insulating film and the semiconductor film can be made very low. Because such high-density plasma treatment oxidizes (or nitrides) a semiconductor film (crystalline silicon, or polycrystalline silicon) directly, the insulating film can be formed with very little unevenness in its thickness ideally. In addition, since crystal grain boundaries of crystalline silicon are also not strongly oxidized, very favorable conditions result. That is, by the solid-phase oxidation of the surface of the semiconductor film by the high-density plasma treatment shown here, an insulating film with good uniformity and low interface state density can be formed without excessive oxidation at crystal grain boundaries.

Note that as the gate insulating film, just an insulating film formed by the high-density plasma treatment may be used, or an insulating film of silicon oxide, silicon oxynitride, silicon nitride, or the like may be formed thereover by a CVD method which employs plasma or a thermal reaction. In any case, when transistors include an insulating film formed by high-density plasma in a part of a gate insulating film or in the whole of a gate insulating film, variation in characteristics can be reduced.

Furthermore, in the crystalline semiconductor films 705a to 705f which are obtained by crystallizing a semiconductor film by irradiation with a continuous wave laser beam or a laser beam oscillated at a repetition rate of 10 MHz or more which is scanned in one direction, crystals can grow in the scanning direction of the laser beam. When transistors are arranged so that the scanning direction is aligned with the channel length direction (the direction in which a carrier flows when a channel formation region is formed) and the above-described gate insulating layer is used in combination with the transistors, thin film transistors with less variation in characteristics and high electric field-effect mobility can be obtained.

Next, a first conductive film and a second conductive film are stacked over the gate insulating film 706. In this embodiment mode, the first conductive film is formed with a thickness of 20 to 100 nm, inclusive, by a CVD method, a sputtering method, or the like. The second conductive film is formed with a thickness of 100 to 400 nm, inclusive. The first conductive film and the second conductive film are formed using an element such as tantalum, tungsten, titanium, molybdenum, aluminum, copper, chromium, or niobium, or using an alloy material or a compound material containing such an element as its main component. Alternatively, they may be formed using a semiconductor material typified by polycrystalline silicon doped with an impurity element such as phosphorus for imparting conductivity. As examples of a combination of the first conductive film and the second conductive film, a tantalum nitride film and a tungsten film, a tungsten nitride film and a tungsten film, a molybdenum nitride film and a molybdenum film, and the like can be given. Because tungsten and tantalum nitride have high heat resistance, heat treatment for thermal activation can be performed after the first conductive film and the second conductive film are formed. In addition, in the case of using a three-layer structure instead of a two-layer structure, a stacked-layer structure in which an aluminum film is interposed between molybdenum films may be used.

Next, a resist mask is formed using a photolithography method, and etching treatment for forming a gate electrode and a gate line is conducted, forming gate electrodes 707 over the crystalline semiconductor films 705a to 705f. In this embodiment mode, an example in which each of gate electrodes 707 has a stacked-layer structure which includes a first conductive film 707a and a second conductive film 707b is described.

Next, the gate electrodes 707 are used as masks, and an impurity element imparting n-type conductivity is added to the crystalline semiconductor films 705a to 705f at a low concentration by an ion doping method or an ion implantation method. Subsequently, a resist mask is selectively formed by a photolithography method, and an impurity element imparting p-type conductivity is added at a high concentration to the crystalline semiconductor films 705a to 705f. As an impurity element which imparts n-type conductivity, phosphorus, arsenic, or the like can be used. As an impurity element which imparts p-type conductivity, boron, aluminum, gallium, or the like can be used. Here, phosphorus is used as an impurity element which imparts n-type conductivity, and is selectively introduced into the crystalline semiconductor films 705a to 705f such that they contain phosphorus at a concentration of $1\times10^{15}$ to $1\times10^{19}/cm^3$. Thus, n-type impurity regions 708 are formed. Further, boron is used as an impurity element which imparts p-type conductivity, and is selectively introduced into the crystalline semiconductor films 705c and 705e such that they contain boron at a concentration of $1\times10^{19}$ to $1\times10^{20}/cm^3$. Thus, p-type impurity regions 709 are formed (see FIG. 11C).

Next, an insulating film is formed so as to cover the gate insulating film 706 and the gate electrodes 707. The insulating film is formed as a single-layer or stacked layers of a film containing an inorganic material such as silicon, an oxide of silicon, or a nitride of silicon, or a film containing an organic material such as an organic resin, by a plasma CVD method, a sputtering method, or the like. Next, the insulating film is selectively etched using anisotropic etching which etches mainly in a perpendicular direction, forming insulating films 710 (also referred to as side walls) which are in contact with side surfaces of the gate electrodes 707. The insulating films 710 are used as masks for doping when lightly doped drain (LDD) regions are formed.

Next, using a resist mask formed by a photolithography method, the gate electrodes 707, and the insulating films 710 as masks, an impurity element which imparts n-type conductivity is added at a high concentration to the crystalline semiconductor films 705a, 705b, 705d, and 705f, to form n-type impurity regions 711. Here, phosphorus is used as an impurity element which imparts n-type conductivity, and it is selectively introduced into the crystalline semiconductor films 705a, 705b, 705d, and 705f such that they contain phosphorus at a concentration of $1\times10^{19}$ to $1\times10^{20}/cm^3$. Thus the n-type impurity regions 711, which have a higher concentration than the impurity regions 708, are formed.

By the foregoing steps, n-channel thin film transistors 700a, 700b, 700d, and 700f, and p-channel thin film transistors 700c and 700e are formed (see FIG. 11D).

In the n-channel thin film transistor 700a, a channel formation region is formed in a region of the crystalline semiconductor film 705a which overlaps with the gate electrode 707; the impurity regions 711 which each form either a source region or a drain region are formed in regions which do not overlap with the gate electrode 707 and the insulating films 710; and LDD regions are formed in regions which overlap with the insulating films 710 and which are between the channel formation region and the impurity regions 711. Further, the n-channel thin film transistors 700b, 700d, and 700f are similarly provided with channel formation regions, LDD regions, and impurity regions 711.

In the p-channel thin film transistor 700c, a channel formation region is formed in a region of the crystalline semiconductor film 705c which overlaps with the gate electrode 707, and the impurity regions 709 which each form a source region or a drain region are formed in regions which do not overlap with the gate electrode 707. Further, the p-channel thin film transistor 700e is similarly provided with a channel formation region and the impurity regions 709. Note that here, the p-channel thin film transistors 700c and 700e are not provided with LDD regions; however, the p-channel thin film transistors may be provided with an LDD region, and the n-channel thin film transistor is not necessarily provided with an LDD region.

Next, an insulating film is formed as a single-layer or stacked layers so as to cover the crystalline semiconductor films 705a to 705f, the gate electrodes 707, and the like, and conductive films 713, which are electrically connected to the impurity regions 709 and 711 which form the source regions and the drain regions of the thin film transistors 700a to 700f, are formed over the insulating film (see FIG. 12A). The insulating film is formed as a single-layer or stacked layers, using an inorganic material, such as an oxide of silicon or a nitride of silicon, an organic material, such as a polyimide, a polyamide, benzocyclobutene, an acrylic, or an epoxy, a siloxane material, or the like, by a CVD method, a sputtering method, an SOG method, a droplet discharge method, a screen printing method, or the like. Here, the insulating film has a two-layer structure. A silicon nitride oxide film is formed as a first insulating film 712a, and a silicon oxynitride film is formed as a second insulating film 712b. Further, the conductive films 713 can form source electrodes and drain electrodes of the thin film transistors 700a to 700f.

Note that before the insulating films 712a and 712b are formed or after one or more thin films of the insulating films 712a and 712b are formed, heat treatment is preferably conducted for recovering the crystallinity of the semiconductor film, for activating an impurity element which has been added to the semiconductor film, or for hydrogenating the semiconductor film. As the heat treatment, thermal annealing, a laser annealing method, an RTA method, or the like is preferably used.

The conductive films 713 are formed as a single-layer or stacked layers using any of the elements such as aluminum, tungsten, titanium, tantalum, molybdenum, nickel, platinum, copper, gold, silver, manganese, neodymium, carbon, and silicon, or an alloy material or a compound material containing one of the above-mentioned elements as its main component, by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both of carbon and silicon. The conductive films 713 preferably employ, for example, a stacked-layer structure including a barrier film, an aluminum film containing silicon, and a barrier film, or a stacked-layer structure including a barrier film, an aluminum film containing silicon, a titanium nitride film, and a barrier film. Note that a barrier film is provided with a thin film formed from titanium, titanium nitride, molybdenum, or molybdenum nitride. Aluminum and aluminum containing silicon, which have low resistance and are inexpensive, are ideal materials for forming the conductive films 713. Further, generation of a hillock of aluminum or aluminum containing silicon can be prevented when upper and lower barrier layers are formed. Furthermore, when the barrier film is formed from titanium, which is a highly-reducible element, even if a thin natural oxide film is formed on the semiconductor film, the natural oxide film can be chemically reduced to remove the natural oxide film, so good contact with the semiconductor film can be obtained.

Next, an insulating film 714 is formed so as to cover the conductive films 713, and over the insulating film 714, conductive films 715a and 715b, which are electrically connected to the conductive films 713 which each form a source electrode or a drain electrode of the thin film transistors 700a and 700f, are formed. Further, a conductive film 716, which is each electrically connected to the conductive film 713 which forms a source electrode or a drain electrode of the thin film transistor 700b is formed. Note that the conductive films 715a and 715b may be formed of the same material at the same step as the conductive film 716. The conductive films 715a and 715b and the conductive film 716 can be formed using any of the materials that the conductive films 713 can be formed of, mentioned above.

Subsequently, a conductive film 717 that serves as an antenna is formed so as to be electrically connected to the conductive film 716 (see FIG. 12B).

The insulating film 714 can be provided by a CVD method, a sputtering method, or the like as a single-layer or stacked layers with a film which includes an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); or a film containing an organic material, such as epoxy, polyimide, polyamide, polyvinyl phenol, benzocyclobutene, or acrylic, or a siloxane material, such as a siloxane resin. Note that a siloxane material corresponds to a material having a Si—O—Si bond. Siloxane has a backbone structure formed of bonds of silicon and oxygen. As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

The conductive film 717 is formed of a conductive material, using a CVD method, a sputtering method, a printing method, such as a screen printing method or a gravure printing method, a droplet discharge method, a dispensing method, a plating method, or the like. The conductive material is any of the elements such as aluminum, titanium, silver, copper, gold, platinum, nickel, palladium, tantalum, and molybdenum, or an alloy material or a compound material containing one of the above-mentioned elements as its main component, and has a single-layer structure or a stacked-layer structure.

For example, in the case of using a screen printing method to form the conductive film 717 which serves as an antenna, the conductive film 717 can be provided by selectively printing a conductive paste in which conductive particles having a grain size of several nm to several tens of μm are dissolved or dispersed in an organic resin. As conductive particles, metal particles of one or more of silver, gold, copper, nickel, platinum, palladium, tantalum, molybdenum, titanium, and the like; fine particles of silver halide; or dispersive nanoparticles can be used. In addition, one or more organic resins selected from organic resins which serve as a binder, a solvent, a dispersing agent, or a coating material for the metal particles can be used as an organic resin included in the conductive paste. An organic resin such as an epoxy resin or a silicone resin can be given as representative examples. Further, it is preferable to conduct baking after the conductive paste is applied. For example, in the case of using fine particles containing silver as a main component (e.g., the grain size is in the range of 1 to 100 nm, inclusive) as a material for the conductive paste, the conductive film can be obtained by curing by baking about 150 to 300° C. Alternatively, fine particles containing solder or lead-free solder as a main component may be used. In that case, preferably fine particles having a grain size of 20 μm or less are used. Solder and lead-free solder have advantages such as low cost.

Further, the conductive films 715a and 715b can each serve as a wiring which is electrically connected to a secondary battery included in a semiconductor device of the present invention in a subsequent process. Furthermore, when the conductive film 717 which serves as an antenna is formed, another conductive film may be separately formed such that it is electrically connected to the conductive films 715a and 715b, and that conductive film may be used as a wiring connected to the secondary battery.

Next, an insulating film 718 is formed so as to cover the conductive film 717, and then a layer (hereinafter referred to as an element formation layer 719) including the thin film transistors 700a to 700f, the conductive film 717, and the like, is separated from the substrate 701. Here, after using laser light (e.g., UV light) irradiation to form openings in regions where the thin film transistors 700a to 700f are not formed (see FIG. 12C), the element formation layer 719 can be separated from the substrate 701 using physical force. Alternatively, before the element formation layer 719 is separated from the substrate 701, an etchant may be introduced into the formed openings to selectively remove the separation layer 703. As the etchant, a gas or liquid containing halogen fluoride or an interhalogen compound is used. For example, chlorine trifluoride is used as a gas containing halogen fluoride. Accordingly, the element formation layer 719 is separated from the substrate 701. Note that the separation layer 703 may be partially left instead of being removed entirely. By leaving the separation layer 703 partially, consumption of the etchant and treatment time required for removing the separation layer can be reduced. Accordingly, throughput increases and cost reduces. Further, the element formation layer 719 can be left over the substrate 701 after the separation layer 703 is removed. Furthermore, by reusing the substrate 701, the cost can be reduced.

The insulating film 718 can be provided by a CVD method, a sputtering method, or the like as a single-layer or stacked layers with a film which includes an insulating film containing oxygen and/or nitrogen, such as silicon oxide ($SiO_x$), silicon nitride ($SiN_x$), silicon oxynitride ($SiO_xN_y$ where x>y), or silicon nitride oxide ($SiN_xO_y$, where x>y); a film containing carbon, such as DLC (diamond-like carbon); or a film containing an organic material, such as epoxy, polyimide, polyamide, polyvinyl phenol, benzocyclobutene, or acrylic, or a siloxane material, such as a siloxane resin.

In this embodiment mode, the openings are formed in the element formation layer 719 by laser light irradiation, and then a first sheet material 720 is attached to one surface of the element formation layer 719 (a surface where the insulating film 718 is exposed). Then, the element formation layer 719 is separated from the substrate 701 (see FIG. 13A).

Next, after attaching a second sheet material 721 to the other surface of the element formation layer 719 (a surface exposed by separation), the second sheet material 721 is attached together by performing one or both of heat treatment and pressure treatment (see FIG. 13B). As the first sheet material 720 and the second sheet material 721, a hot-melt film or the like can be used.

As the first sheet material 720 and the second sheet material 721, films on which antistatic treatment for preventing static electricity or the like has been performed (hereinafter referred to as antistatic films) can be used. Examples of antistatic films are films in which a material that can prevent electrostatic charge is dispersed in a resin, films to which a material that can prevent electrostatic charge is attached, and the like. A film provided with a material that can prevent electrostatic charge may be a film which has a material that can prevent electrostatic charge provided over only one of its surfaces, or a film which has a material that can prevent electrostatic charge provided over both of its surfaces. Concerning the film which has a material that can prevent electrostatic charge provided over one of its surfaces, the film may be attached to the layer such that the material that can prevent electrostatic charge is on the inner side of the film or the outer side of the film. Note that the material that can prevent electrostatic charge may be provided over the entire surface of the film, or over a part of the film. As a material that can prevent electrostatic charge, a metal which is a conductive material, indium tin oxide (ITO), or a surfactant such as an amphoteric surfactant, a cationic surfactant, or a nonionic surfactant can be used. In addition to that, as an antistatic material, a resin material containing a cross-linked copolymer having a carboxyl group and a quaternary ammonium base on its side chain, or the like can be used. By attaching, mixing, or applying such a material to a film, an antistatic film can be formed. By performing sealing using the antistatic film, adverse effect to the semiconductor element by static electricity from outside and the like can be prevented when dealt with as a product can be reduced.

Note that a storage capacitor element of a power supply circuit is formed such that a thin film secondary battery is connected to the conductive films 715a and 715b. The connection with the secondary battery may be made before the element formation layer 719 is separated from the substrate 701 (at a stage shown in FIG. 12B or FIG. 12C), after the element formation layer 719 is separated from the substrate 701 (at a stage shown in FIG. 13A), or after the element formation layer 719 is sealed with the first sheet material and the second sheet material (at a stage shown in FIG. 13B). An example in which the element formation layer 719 and the secondary battery are connected to each other is described below with reference to FIGS. 14A to 15B.

In FIG. 12B, conductive films 731a and 731b, which are electrically connected to the conductive films 715a and 715b, respectively, are formed at the same time as the conductive film 717 which serves as an antenna. Next, the insulating film 718 is formed so as to cover the conductive film 717 and the conductive films 731a and 731b. Then, openings 732a and 732b are formed so as to expose surfaces of the conductive films 731a and 731b. After that, after openings are formed in the element formation layer 719 by laser light irradiation, the first sheet material 720 is attached to one surface of the element formation layer 719 (the surface where the insulating film 718 is exposed); and then, the element formation layer 719 is separated from the substrate 701 (see FIG. 14A).

Next, the second sheet material 721 is attached to the other surface (a surface exposed by separation) of the element formation layer 719, and the element formation layer 719 is then separated from the first sheet material 720. Accordingly, in this embodiment mode, a sheet material with weak adhesion is used as the first sheet material 720. Then, conductive films 734a and 734b, which are electrically connected to the conductive films 731a and 731b, respectively, through the openings 732a and 732b, are selectively formed (see FIG. 14B).

The conductive film 734a and the conductive film 734b are formed of a conductive material, using a CVD method, a sputtering method, a printing method such as a screen printing method or a gravure printing method, a droplet discharge method, a dispensing method, a plating method, or the like. The conductive material is any of the elements such as aluminum, titanium, silver, copper, gold, platinum, nickel, palladium, tantalum, and molybdenum, or an alloy material or a compound material containing one of the above-mentioned elements as its main component, and has a single-layer structure or a stacked-layer structure.

Note that in this embodiment mode, an example in which the conductive films 734a and 734b are formed after the element formation layer 719 is separated from the substrate 701 is described; however, the element formation layer 719 may be separated from the substrate 701 after the conductive films 734a and 734b are formed.

Figure 15A:
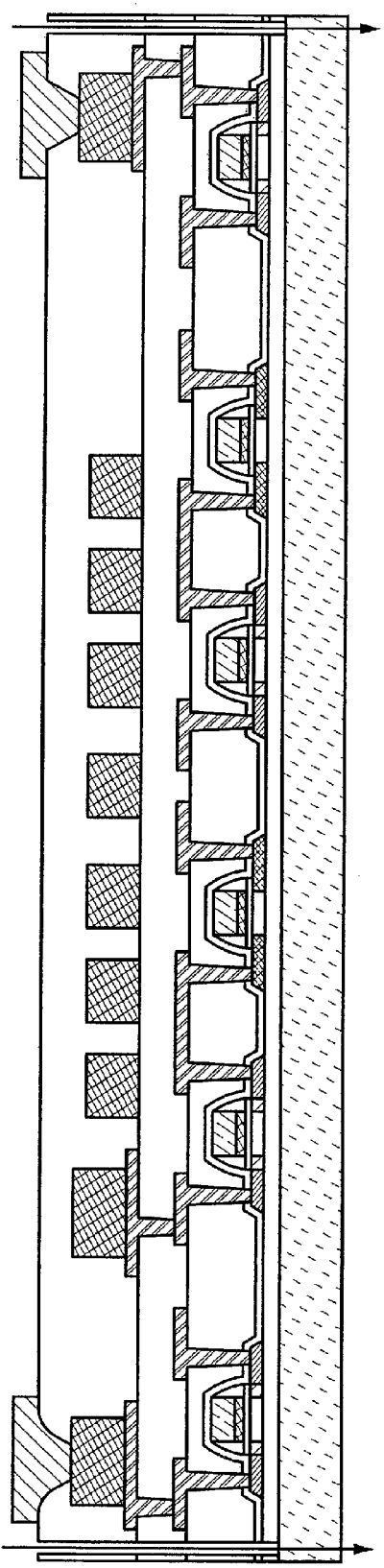
FIGS. 15A and 15B are diagrams illustrating a manufacturing process of a semiconductor device of the present invention.

Next, in the case where a plurality of elements are formed over the substrate, the element formation layer 719 is separated into elements (see FIG. 15A). A laser irradiation apparatus, a dicing apparatus, a scribing apparatus, or the like can be used for the separation. Here, the plurality of elements formed over one substrate are separated from one another by laser light irradiation.

Figure 15B:
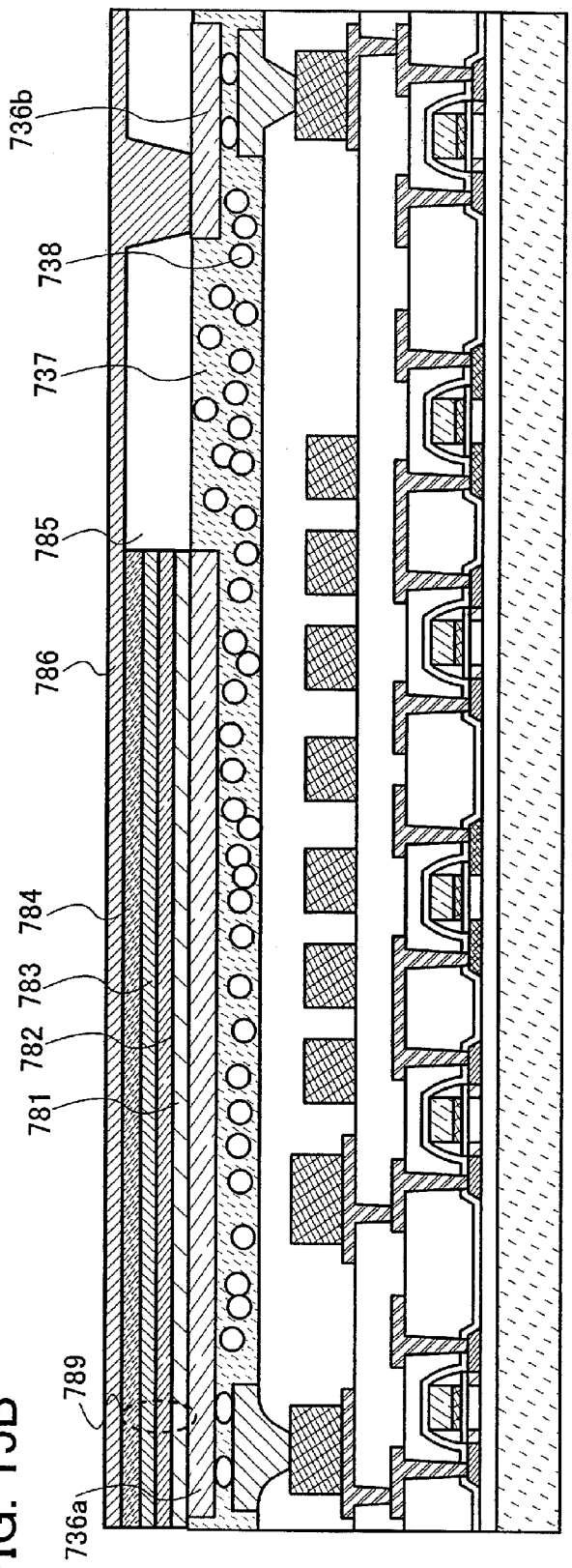

Subsequently, the separated elements are electrically connected to the secondary battery (see FIG. 15B). In this embodiment mode, a thin film secondary battery is used for the storage capacitor element of the power supply circuit, and the following thin films are sequentially stacked: a current-collecting thin film, a negative electrode active material layer, a solid electrolyte layer, a positive electrode active material layer, and a current-collecting thin film.

A conductive film 736a and a conductive film 736b are formed of a conductive material, using a CVD method, a sputtering method, a printing method, such as a screen printing method or a gravure printing method, a droplet discharge method, a dispensing method, a plating method, or the like. The conductive material is any of the elements such as aluminum, titanium, silver, copper, gold, platinum, nickel, palladium, tantalum, and molybdenum, or an alloy material or a compound material containing one of the above-mentioned elements as its main component, and has a single-layer structure or a stacked-layer structure. The conductive material is preferably has good adhesion to a negative electrode active material and have low resistance. Aluminum, copper, nickel, vanadium, or the like is particularly preferable as the conductive material.

Next, a structure of the thin film secondary battery is described in detail. First, a negative electrode active material layer 781 is formed over the conductive film 736a. In general, vanadium oxide ($V_2O_5$) or the like is used. Next, a solid electrolyte layer 782 is formed over the negative electrode active material layer 781. In general, lithium phosphate ($Li_3PO_4$) or the like is used. Then, a positive electrode active material layer 783 is formed over the solid electrolyte layer 782. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 784 that becomes an electrode is formed over the positive electrode active material layer 783. The current-collecting thin film 784 is desired to have good adhesion to the positive electrode active material layer 783 and have low resistance, and aluminum, copper, nickel, vanadium, or the like can be used.

Each of the foregoing thin film layers, that is, the negative electrode active material layer 781, the solid electrolyte layer 782, the positive electrode active material layer 783, and the current-collecting thin film 784, may be formed using a sputtering technique or an evaporation technique. Further, the thickness of each layer is desirably 1 to 3 μm.

Next, a resin film is formed by a spin coating method or the like. Then, the interlayer film is etched to form a contact hole. The interlayer film is not limited to a resin film, and may be another film such as an oxide film or the like formed by a CVD method; however, a resin is desirable in terms of flatness. Alternatively, a contact hole may be formed without etching, using a photosensitive resin. Subsequently, by forming a wiring layer 786 over the interlayer film and connecting to a conductive film 734b, electrical connection of the secondary battery is obtained.

Here, the conductive films 734a and 734b provided over the element formation layer 719 are connected to the conductive films 736a and 736b that serve as connecting terminals of the thin film secondary battery 789, respectively. A case is shown in which the conductive film 734a and the conductive film 736a, or the conductive film 734b and the conductive film 736b are pressure-bonded to each other with a material having an adhesive property such as an anisotropic conductive film (ACF) or an anisotropic conductive paste (ACP) interposed therebetween, so that they are electrically connected to each other. An example is shown in which conductive particles 738 contained in a resin 737 having an adhesive property are used for connection. Alternatively, connection can be made using a conductive adhesive agent such as a silver paste, a copper paste, or a carbon paste, or using solder bonding, or the like.

Note that a structure of a transistor can be of various modes, and is not limited to the specific structure described in this embodiment mode. For example, a multi-gate structure in which there are two or more gate electrodes may be used. In a multi-gate structure, channel regions are connected series; accordingly, the structure is that a plurality of transistors are serially connected in series. By having a multi-gate structure, off-current is reduced and withstand voltage of the transistors is improved whereby reliability is improved. Even if voltage between the drain electrode and the source electrode changes in operation in a saturated region, current between the drain electrode and the source electrode does not change very much and a flat characteristic or the like can be obtained. In addition, the structure may be that gate electrodes are placed over and under a channel. By gate electrodes being placed over and under the channel, the channel region increases; accordingly, a current value can be made to be large and a depletion layer is easily formed, thereby reducing a subthreshold coefficient. When the gate electrodes are placed over and under the channel, the structure is like that a plurality of transistors are connected in parallel.

Alternatively, the structure may be that a gate electrode is placed over the channel formation region, that a gate electrode is placed under the channel formation region, a staggered structure, or an inversely staggered structure. Further alternatively, the structure may be that a channel formation region is divided into a plurality of regions, and the divided channel formation regions are connected in parallel, or in series. Further, a source electrode or a drain electrode may overlap with the channel formation region (or a portion thereof). By having a structure in which the source electrode or drain electrode overlaps with the channel formation region (or a portion thereof), unstable operation due to accumulation of charge in a portion of the channel formation region can be prevented. Further, there may also be a lightly doped drain (LDD) region. By providing an LDD region, off-current is reduced and withstand voltage of the transistors is improved whereby reliability is improved, and even if voltage between the drain electrode and the source electrode changes in operation in a saturated region, current between the drain electrode and the source electrode does not change very much and a flat characteristic or the like can be obtained.

The manufacturing method of the semiconductor device of this embodiment can be applied to the semiconductor devices of other embodiment modes described in this specification. In other words, in accordance with this embodiment mode, the semiconductor device which can communicate or supply electric power in a plurality of frequency bands using one antenna can be manufactured.

[EMBODIMENT MODE 5]

This embodiment mode will describe an example of a manufacturing method of the semiconductor device described in the above embodiment mode with reference to drawings. In this embodiment mode, a structure in which an antenna, a battery, and a signal processing circuit of the semiconductor device are provided over the same substrate is described. Note that using a transistor in which a channel formation region is formed on a single-crystal substrate, the antenna, the battery, and the signal processing circuit are formed on the same substrate. Using a transistor formed on a single-crystal substrate is favorable since the semiconductor device can be composed of a transistor with little variation in electrical characteristic. An example using the thin film secondary battery for the battery will be described.

Figure 16A:
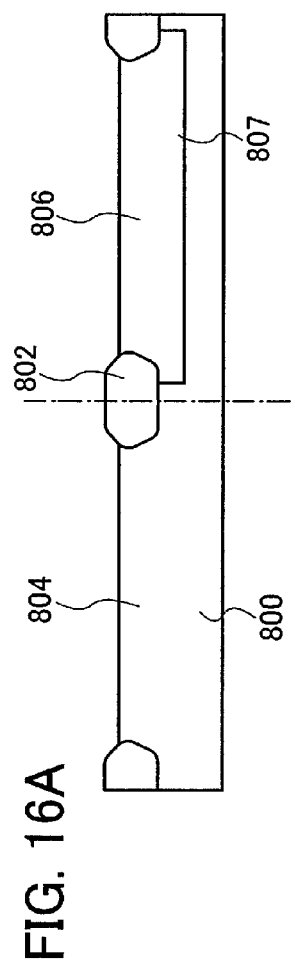
FIG. 16A to 16C are diagrams illustrating a manufacturing process of a semiconductor device of the present invention.

First, regions 804 and 806 are formed by separating an element region in a semiconductor substrate 800 (see FIG. 16A). The regions 804 and 806 provided in the semiconductor substrate 800 are separated from each other by an insulating film 802 (also referred to as a field oxide film). The example shown herein is the case where a single-crystal Si substrate having n-type conductivity is used as the semiconductor substrate 800, and a p-well 807 is formed in the region 806 of the semiconductor substrate 800.

Any substrate can be used as the semiconductor substrate 800 as long as it is a semiconductor substrate. For example, a single-crystal Si substrate having n-type or p-type conductivity, a compound semiconductor substrate (e.g., a GaAs substrate, an InP substrate, a GaN substrate, a SiC substrate, a sapphire substrate, or a ZnSe substrate), a SOI (silicon on insulator) substrate formed by using a bonding method or a SIMOX (separation by implanted oxygen), or the like can be used.

The regions 804 and 806 can be formed by a selective oxidation (LOCOS: LOCal Oxidation of Silicon) method, a trench isolation method, or the like.

In addition, the p-well formed in the region 806 of the semiconductor substrate 800 can be formed by selectively introducing an impurity element imparting p-type conductivity in the semiconductor substrate 800. As an impurity element imparting p-type conductivity, boron, aluminum, gallium, or the like can be used.

In this embodiment mode, although an impurity element is not introduced to the region 804 because an n-type semiconductor substrate is used as the semiconductor substrate 800, an n-well may be formed in the region 804 by introducing an impurity element imparting n-type conductivity. As an impurity element imparting n-type conductivity, phosphorus, arsenic, or the like can be used. When a semiconductor substrate having p-type conductivity is used, on the other hand, a structure may be employed in which an n-type impurity element is introduced to the region 804 to form an n-well, whereas an impurity element is not introduced to the region 806.

Figure 16B:
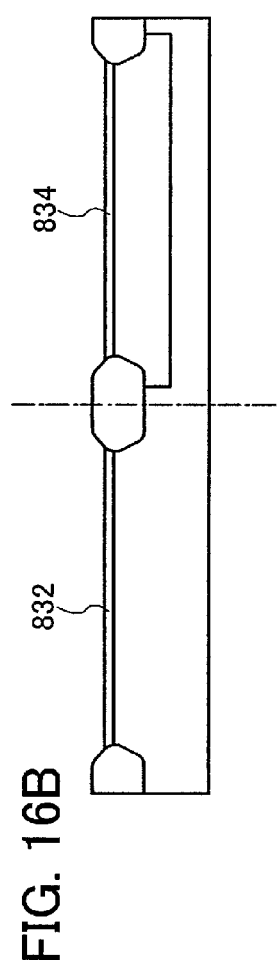

Next, insulating films 832 and 834 are formed so as to cover the regions 804 and 806, respectively (see FIG. 16B).

The insulating films 832 and 834 can be formed of, for example, silicon oxide films by oxidizing the surfaces of the regions 804 and 806 provided in the semiconductor substrate 800 by thermal treatment. Alternatively, the insulating films 832 and 834 can be formed to have a stacked structure of a silicon oxide film and a film containing oxygen and nitrogen (a silicon oxynitride film) by conducting the steps of forming a silicon oxide film by a thermal oxidation method and then nitriding the surface of the silicon oxide film by nitridation treatment.

Further alternatively, the insulating films 832 and 834 can be formed by using plasma treatment as described above. For example, the insulating films 832 and 834 can be formed using a silicon oxide film or a silicon nitride film which is obtained by performing high-density-plasma oxidation or nitridation treatment on the surfaces of the regions 804 and 806 provided in the semiconductor substrate 800. Further, after performing high-density-plasma oxidation treatment on the surfaces of the regions 804 and 806, high-density-plasma nitridation treatment may be conducted. In that case, silicon oxide films are formed on the surfaces of the regions 804 and 806 and then silicon oxynitride films are formed on the silicon oxide films. Thus, the insulating films 832 and 834 are each formed to have a stacked structure of the silicon oxide film and the silicon oxynitride film. In addition, it is also possible to conduct the steps of forming silicon oxide films on the surfaces of the regions 804 and 806 by a thermal oxidation method, and then performing high-density-plasma oxidation or nitridation treatment on the surface of silicon oxide films.

The insulating films 832 and 834 formed over the regions 804 and 806 of the semiconductor substrate 800 function as the gate insulating films of transistors which are completed later.

Figure 16C:
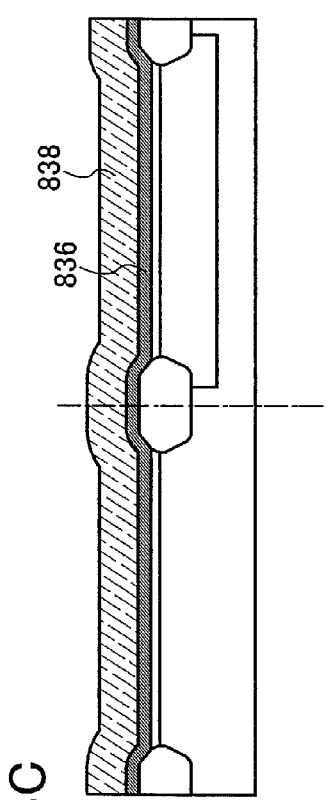

Next, a conductive film is formed so as to cover the insulating films 832 and 834 which are formed over the regions 804 and 806 (see FIG. 16C). Here, an example is shown where conductive films 836 and 838 are stacked in order as the conductive film. Needless to say, the conductive film may be formed to have a single-layer or a stacked structure of three or more layers.

As a material of the conductive films 836 and 838, an element selected from among tantalum, tungsten, titanium, molybdenum, aluminum, copper, chromium, niobium, and the like, or an alloy material or a compound material containing such an element as a main component can be used. Alternatively, a metal nitride film obtained by nitriding the above element can also be used. Further, a semiconductor material typified by polycrystalline silicon doped with an impurity element such as phosphorus can also be used.

Here, a stacked structure is employed in which the conductive film 836 is formed using a tantalum nitride film and the conductive film 838 is formed thereover using a tungsten film. Alternatively, it is also possible to form the conductive film 836 using a single-layer or stacked layers of a tungsten nitride film, a molybdenum nitride film, and/or a titanium nitride film and to form the conductive film 838 using a single-layer or stacked layers of a tantalum film, a molybdenum film, and/or a titanium film.

Next, the stacked conductive films 836 and 838 are selectively removed by etching, so that the conductive films 836 and 838 are remained in desired places above the regions 804 and 806. Thus, gate electrodes 840 and 842 are formed (see FIG. 17A).

Next, a resist mask 848 is selectively formed so as to cover the region 804, and an impurity element is introduced to a desired place of the region 806 using the resist mask 848 and the gate electrode 842 as masks, whereby impurity regions are formed (see FIG. 17B). As an impurity element, an impurity element imparting n-type conductivity or an impurity element imparting p-type conductivity is used. As an impurity element imparting n-type conductivity, phosphorus, arsenic, or the like can be used. As an impurity element imparting p-type conductivity, boron, aluminum, gallium, or the like can be used. Here, phosphorus is used as the impurity element.

In FIG. 17B, with the impurity element introduced, impurity regions 852 which form source and drain regions and a channel formation region 850 are formed in the region 806.

Next, a resist mask 866 is selectively formed so as to cover the region 806, and an impurity element is introduced to the region 804 using the resist mask 866 and the gate electrode 840 as masks, whereby impurity regions are formed (see FIG. 17C). As the impurity element, an impurity element imparting n-type conductivity or an impurity element imparting p-type conductivity is used. As an n-type impurity element, phosphorus, arsenic, or the like can be used. As a p-type impurity element, boron, aluminum, gallium, or the like can be used. Here, an impurity element (e.g., boron) of a conductivity type opposite to that of the impurity element which has been introduced into the region 806 in FIG. 17B is used. As a result, impurity regions 870 which form source and drain regions and a channel formation region 868 are formed in the region 804.

Figure 18A:
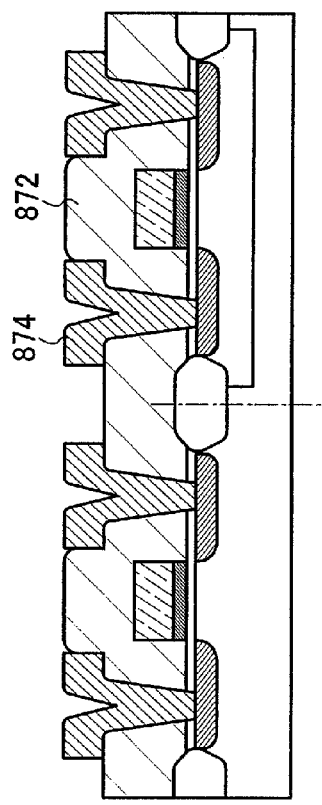
FIGS. 18A and 18B are diagrams illustrating a manufacturing process of a semiconductor device of the present invention.

Next, an insulating film 872 is formed so as to cover the insulating films 832 and 834 and the gate electrodes 840 and 842. Then, wirings 874, which are electrically connected to the impurity regions 852 and 870 formed in the regions 804 and 806, are formed over the insulating film 872 (see FIG. 18A).

The second insulating film 872 can be provided by a CVD method, a sputtering method, or the like as a single-layer or stacked layers with a film which includes an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); or a film containing an organic material, such as epoxy, polyimide, polyamide, polyvinyl phenol, benzocyclobutene, or acrylic, or a siloxane material, such as a siloxane resin. Note that a siloxane material corresponds to a material having a Si—O—Si bond. Siloxane has a backbone structure formed of bonds of silicon and oxygen. As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

The wirings 874 are formed as a single-layer or stacked layers using a film formed of an element selected from such as aluminum, tungsten, titanium, tantalum, molybdenum, nickel, platinum, copper, gold, silver, manganese, neodymium, carbon, and silicon, or an alloy material or a compound material containing such an element as a main component. An alloy material containing aluminum as the main component corresponds to, for example, a material which contains aluminum as a main component and also contains nickel, or a material which contains aluminum as a main component and also contains nickel and one or both of carbon and silicon. The wirings 874 are preferably formed to have a stacked structure of a barrier film, an aluminum film containing silicon, and a barrier film or a stacked structure of a barrier film, an aluminum film containing silicon, a titanium nitride film, and a barrier film. Note that "barrier film" corresponds to a thin film made of titanium, titanium nitride, molybdenum, or molybdenum nitride. Aluminum and aluminum containing silicon, which have low resistance and are inexpensive, are the most suitable material for forming the wirings 874. When barrier films are provided in the top layer and the bottom layer, generation of hillocks of aluminum or aluminum containing silicon can be prevented. When a barrier film made of titanium which is an element having a high reducing property is formed, even when there is a thin natural oxide film formed on the crystalline semiconductor film, the natural oxide film can be chemically reduced, and a favorable contact between the wirings 874 and the crystalline semiconductor film can be obtained.

Note that the structure of the transistor which is applied to the present invention is not limited to the one shown in the drawings. For example, a transistor with an inversely staggered structure, a fin FET structure, or the like can be used. A fin FET structure is advantageous in that it can suppress a short channel effect which would occur with the reduction of transistor size.

Further, in the semiconductor device of the present invention, a battery which can supply electric power to the signal processing circuit and can store electric power is provided. As the battery, it is preferable to use a capacitor such as an electrical double layer capacitor or a thin film secondary battery. In this embodiment mode, a connection between a transistor and a thin film secondary battery is described.

Figure 18B:
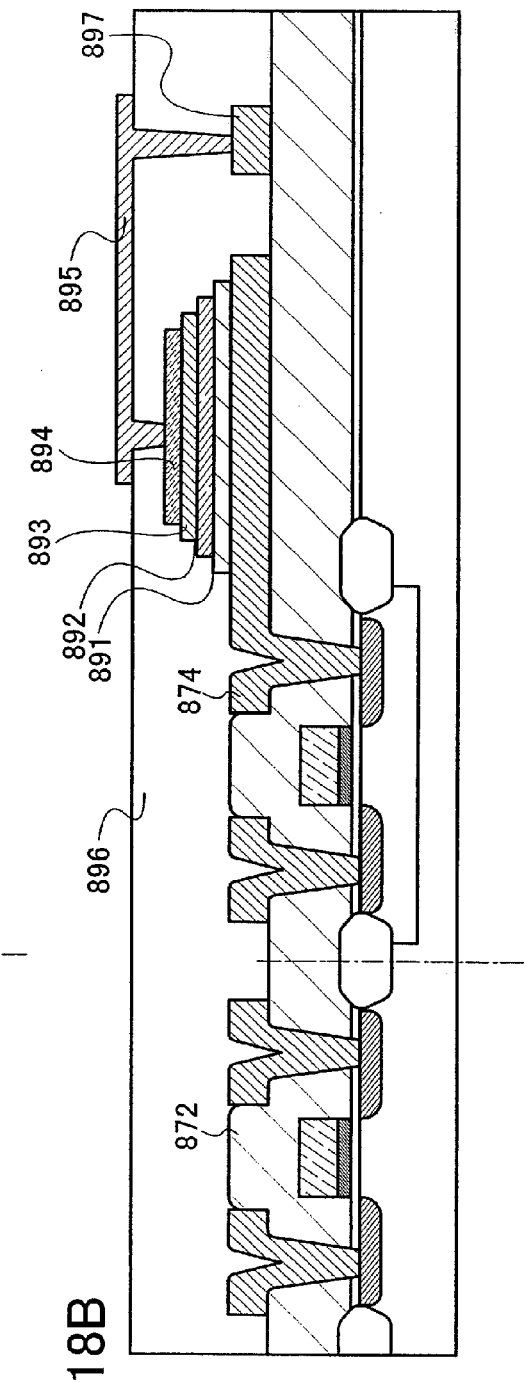

In this embodiment mode, the secondary battery is stacked and formed over the wirings 874, which are connected to a transistor. For the secondary battery, a current-collecting thin film, a negative electrode active material layer, a solid electrolyte layer, a positive electrode active material layer, and a current-collecting thin film are stacked in order (FIG. 18B). Accordingly, a material of the wirings 874, which doubles as the current-collecting thin film of the secondary battery, is desired to have good adhesion to the negative electrode active material and have low resistance, and aluminum, copper, nickel, vanadium, or the like is particularly preferable as the material.

Next, a structure of the thin film secondary battery is described in detail. First, a negative electrode active material layer 891 is formed over the wiring 874. In general, vanadium oxide ($V_2O_5$) or the like is used. Next, a solid electrolyte layer 892 is formed over the negative electrode active material layer 891. In general, lithium phosphate ($Li_3PO_4$) or the like is used. Then, a positive electrode active material layer 893 is formed over the solid electrolyte layer 892. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 894 that becomes an electrode is formed over the positive electrode active material layer 893. The current-collecting thin film 894 is desired to have good adhesion to the positive electrode active material layer 893 and have low resistance and aluminum, copper, nickel, vanadium, or the like can be used.

Each of the foregoing thin film layers, that is, the negative electrode active material layer 891, the solid electrolyte layer 892, the positive electrode active material layer 893, and the current-collecting thin film 894, may be formed using a sputtering technique or an evaporation technique. Further, the thickness of each layer is desirably 1 to 3 μm.

Next, a resin film is formed by a spin coating method or the like. Then, the resin film is etched to form a contact hole and an interlayer film 896 is formed. The interlayer film 896 is not limited to a resin film, and may be another film such as an oxide film or the like formed by a CVD method; however, a resin is desirable in terms of flatness. Alternatively, the contact hole may be formed without etching, using a photosensitive resin. Subsequently, by forming a wiring layer 895 over the interlayer film 896 and connecting to a conductive film 897, electrical connection of the secondary battery is obtained.

With such a structure as the foregoing structure, the semiconductor device of the present invention can have a structure in which a transistor is formed on a single-crystal substrate and a thin film secondary battery is provided thereover. Accordingly, by applying the structure of this embodiment mode, a semiconductor device which is thinner and more compact than in the case of using other battery can be manufactured.

The manufacturing method of the semiconductor device of this embodiment can be applied to the semiconductor devices of other embodiment modes described in this specification. In other words, in accordance with this embodiment mode, the semiconductor device which can communicate or supply electric power in a plurality of frequency bands using one antenna can be manufactured.

[EMBODIMENT MODE 6]

This embodiment mode will describe an example of a manufacturing method of a semiconductor device that is different from that of the foregoing embodiment modes with reference to drawings.

Figure 19A:
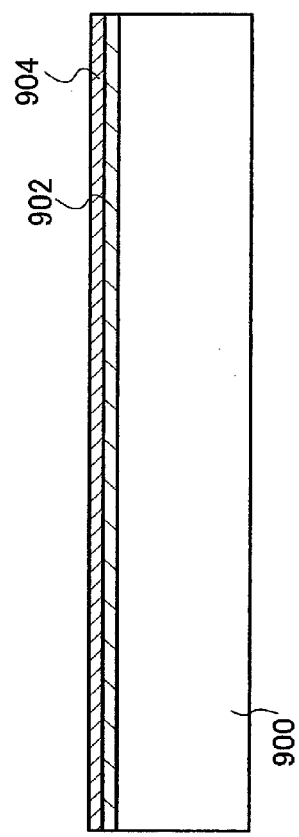
FIG. 19A to 19C are diagrams illustrating a manufacturing process of a semiconductor device of the present invention.

First, an insulating film is formed over a substrate 900. Here, a single-crystal silicon substrate having n-type conductivity is used as the substrate 900, and insulating films 902 and 904 are formed over the substrate 900 (see FIG. 19A). For example, a silicon oxide film is formed as the insulating film 902 by performing thermal treatment on the substrate 900, and then a silicon nitride film is formed over the insulating film 902 by a CVD method.

The semiconductor substrate 900 is not limited to a silicon substrate as long as it is a semiconductor substrate. For example, a single-crystal Si substrate having n-type or p-type conductivity, a compound semiconductor substrate (e.g., a GaAs substrate, an InP substrate, a GaN substrate, a SiC substrate, a sapphire substrate, or a ZnSe substrate), a SOI (silicon on insulator) substrate formed by using a bonding method or a SIMOX (separation by implanted oxygen), or the like can be used.

Alternatively, after forming the insulating film 902, the insulating film 904 may be formed by nitriding the insulating film 902 by high-density-plasma treatment. Note that the insulating film provided over the substrate 900 may be a single-layer or a stacked structure of three or more layers.

Figure 19B:
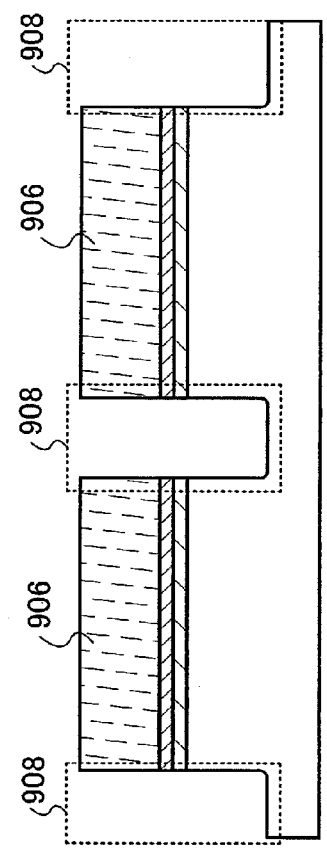

Next, patterns of a resist mask 906 are selectively formed over the insulating film 904, and selective etching is conducted using the resist mask 906 as a mask, whereby recessed portions 908 are selectively formed in the substrate 900 (see FIG. 19B). For the etching of the substrate 900 and the insulating films 902 and 904, plasma dry etching can be used.

Figure 19C:
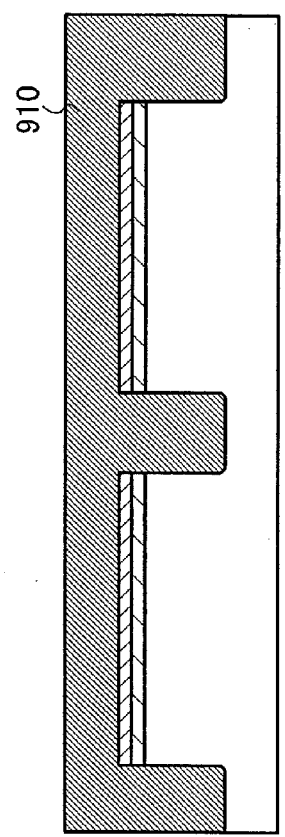

Next, the patterns of the resist mask 906 are removed, and then an insulating film 910 is formed so as to fill the recessed portions 908 formed in the substrate 900 (see FIG. 19C).

The insulating film 910 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. Here, a silicon oxide film is formed by an atmospheric pressure CVD method or a low-pressure CVD method using a TEOS (tetraethyl orthosilicate) gas.

Figure 20A:
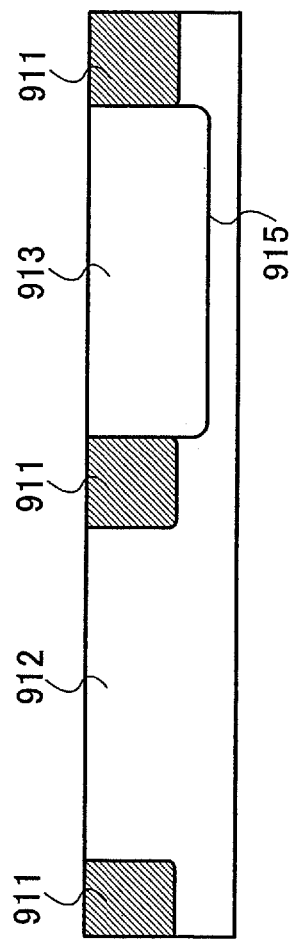
FIG. 20A to 20C are diagrams illustrating a manufacturing process of a semiconductor device of the present invention.

Next, the surface of the substrate 900 is exposed by grinding, polishing, or CMP (chemical mechanical polishing). Here, by exposing the surface of the substrate 900, regions 912 and 913 are formed between insulating films 911 which are formed in the recessed portions 908 of the substrate 900. Note that the insulating films 911 are obtained by removing the insulating film 910 formed over the surface of the substrate 900 by grinding, polishing, or CMP. Subsequently, by selectively introducing an impurity element imparting p-type conductivity, a p-well 915 is formed in the region 913 of the substrate 900 (see FIG. 20A).

As an impurity element imparting p-type conductivity, boron, aluminum, gallium, or the like can be used. Here, boron is introduced into the region 913 as the impurity element.

In this embodiment mode, although an impurity element is not introduced to the region 912 because a semiconductor substrate having n-type conductivity is used as the substrate 900, an n-well may be formed in the region 912 by introducing an n-type impurity element. As an n-type impurity element, phosphorus, arsenic, or the like can be used.

When a semiconductor substrate having p-type conductivity is used, the substrate may have a structure in which an impurity element imparting n-type conductivity is introduced to the region 912 to form an n-well, whereas an impurity element is not introduced to the region 913.

Figure 20B:
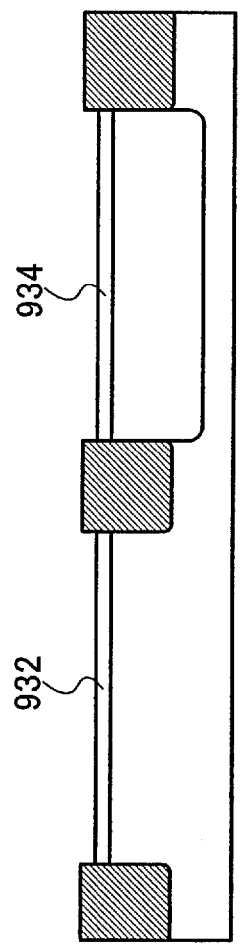

Next, insulating films 932 and 934 are formed over the surfaces of the regions 912 and 913 in the substrate 900, respectively (see FIG. 20B).

The insulating films 932 and 934 can be formed of silicon oxide films, for example, by oxidizing the surfaces of the regions 912 and 913 provided in the substrate 900 by thermal treatment. Alternatively, the insulating films 932 and 934 can be formed to have a stacked structure of a silicon oxide film and a film containing oxygen and nitrogen (a silicon oxynitride film) by conducting the steps of forming a silicon oxide film by a thermal oxidation method and then nitriding the surface of the silicon oxide film by nitridation treatment.

Further alternatively, the insulating films 932 and 934 can be formed by plasma treatment as described above. For example, the insulating films 932 and 934 can be formed using a silicon oxide film or a silicon nitride film which is obtained by performing high-density-plasma treatment to oxidize or nitride the surfaces of the regions 912 and 913 provided in the substrate 900. Further, after performing high-density-plasma oxidation treatment on the surfaces of the regions 912 and 913, nitridation treatment may be conducted by performing high-density-plasma treatment again. In that case, silicon oxide films are formed on the surfaces of the regions 912 and 913 and then silicon oxynitride films are formed on the silicon oxide films. Thus, the insulating films 932 and 934 are each formed to have a stacked structure of the silicon oxide film and the silicon oxynitride film. In addition, it is also possible to conduct the forming silicon oxide films on the surfaces of the regions 912 and 913 by a thermal oxidation method, and then performing high-density-plasma treatment to oxidize or nitride the surface of the silicon oxide films.

Note that the insulating films 932 and 934 that are formed in the regions 912 and 913 of the substrate 900 function as the gate insulating films of transistors which are completed later.

Figure 20C:
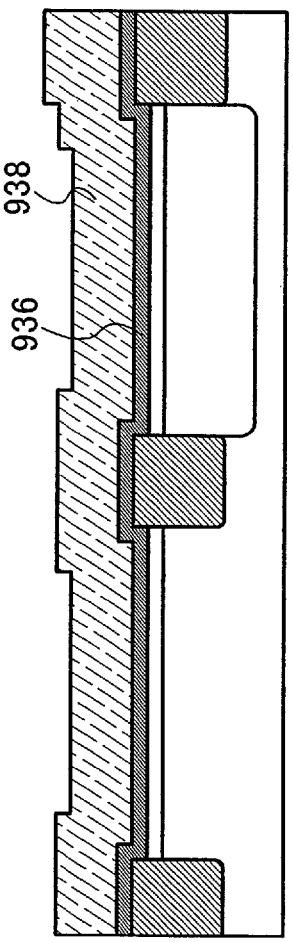

Next, a conductive film is formed so as to cover the insulating films 932 and 934 which are formed over the regions 912 and 913 provided in the substrate 900 (see FIG. 20C). Here, an example is shown in which conductive films 936 and 938 are stacked in order as the conductive film. Needless to say, the conductive film may be formed with a single-layer or three or more stacked layers.

As a material of the conductive films 936 and 938, an element selected from such as tantalum, tungsten, titanium, molybdenum, aluminum, copper, chromium, niobium, and the like, or an alloy material or a compound material containing such an element as a main component can be used. Alternatively, a metal nitride film obtained by nitriding the above element can also be used. Further, a semiconductor material typified by polycrystalline silicon doped with an impurity element such as phosphorus can also be used.

Here, a stacked structure is employed in which the conductive film 936 is formed using a tantalum nitride film and the conductive film 938 is formed thereover by forming a tungsten film. Alternatively, it is also possible to form the conductive film 936 using a film of a single-layer film or a stacked film which is formed of a material such as tantalum nitride, tungsten nitride, molybdenum nitride, and/or titanium nitride and form the conductive film 938 using a film of a single-layer film or a stacked film which is formed of a material such as tungsten, tantalum, molybdenum, and/or titanium.

Figure 21A:
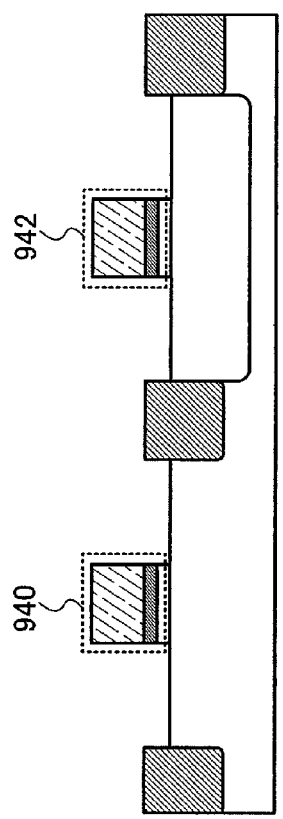
FIG. 21A to 21C are diagrams illustrating a manufacturing process of a semiconductor device of the present invention.

Next, the stacked conductive films 936 and 938 are selectively removed by etching, so that the conductive films 936 and 938 partially remain above the regions 912 and 913 of the substrate 900. Thus, conductive films 940 and 942 functioning as gate electrodes are formed (see FIG. 21A). Here, the surfaces of the regions 912 and 913 of the substrate 900 which do not overlap with the conductive films 940 and 942 are exposed.

Specifically, in the region 912 of the substrate 900, the insulating film 932 formed below the conductive film 940 is partially removed in regions which do not overlap with the conductive film 940, so that the ends of the conductive film 940 and the ends of the insulating film 932 are roughly in alignment. In addition, in the region 913 of the substrate 900, the insulating film 934 formed below the conductive film 942 is partially removed in regions which do not overlap with the conductive film 942, so that the ends of the conductive film 942 and the ends of the insulating film 934 are roughly in alignment.

In this case, the parts of the insulating films which do not overlap with the conductive films 940 and 942 may be removed at the same time as the formation of the conductive films 940 and 942. Alternatively, the parts of the insulating films which do not overlap with the conductive films 940 and 942 may be removed by using resist masks which are left after forming the conductive films 940 and 942, or by using the conductive films 940 and 942 as masks.

Figure 21B:
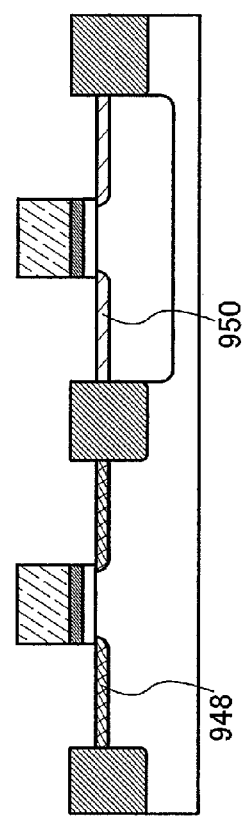

Then, an impurity element is selectively introduced to the regions 912 and 913 of the substrate 900 (see FIG. 21B). Here, an n-type impurity element is selectively introduced to the region 913, using the conductive film 942 as a mask, whereas a p-type impurity element is selectively introduced to the region 912, using the conductive film 940 as a mask. As an n-type impurity element, phosphorus, arsenic, or the like can be used. As a p-type impurity element, boron (B), aluminum, gallium, or the like can be used.

Next, sidewalls 954 being in contact with the side surfaces of the conductive films 940 and 942 are formed. Specifically, a film containing an inorganic material such as silicon, oxide of silicon, nitride of silicon, or the like, or a film containing an organic material such as an organic resin is formed in a single-layer or in stacked layers. Then, the insulating film is selectively etched by anisotropic etching, which is mainly in the perpendicular direction, so that the sidewalls 954 can be formed so as to be in contact with the side surfaces of the conductive films 940 and 942. The sidewalls 954 are used as doping masks for forming LDD (lightly doped drain) regions. In addition, the sidewalls 954 are formed to be in contact with the side surfaces of insulating films which are formed below the conductive films 940 and 942.

Figure 21C:
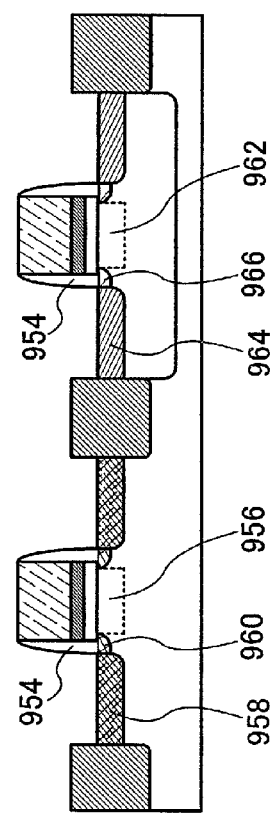

Next, by introducing an impurity element to the regions 912 and 913 of the substrate 900, using the sidewalls 954 and the conductive films 940 and 942 as masks, impurity regions which function as source and drain regions are formed (see FIG. 21C). Here, an n-type impurity element is introduced to the region 913 of the substrate 900 at a higher concentration than that of the LDD region, using the sidewalls 954 and the conductive film 942 as a mask, whereas a p-type impurity element is introduced to the region 912 at a higher concentration than that of the LDD region, using the sidewalls 954 and the conductive film 940 as a mask.

As a result, impurity regions 958 which form source and drain regions, LDD regions 960, and a channel formation region 956 are formed in the region 912 of the substrate 900. Meanwhile, impurity regions 964 which form source and drain regions, LDD regions 966, and a channel formation region 962 are formed in the region 913 of the substrate 900.

Note that in this embodiment mode, the impurity elements are introduced under the condition that the regions 912 and 913 of the substrate 900 which do overlap with the conductive films 940 and 942 are exposed. Accordingly, the channel formation regions 956 and 962 which are formed in the regions 912 and 913 of the substrate 900 respectively can be formed in a self-aligned manner using the conductive films 940 and 942.

Figure 22A:
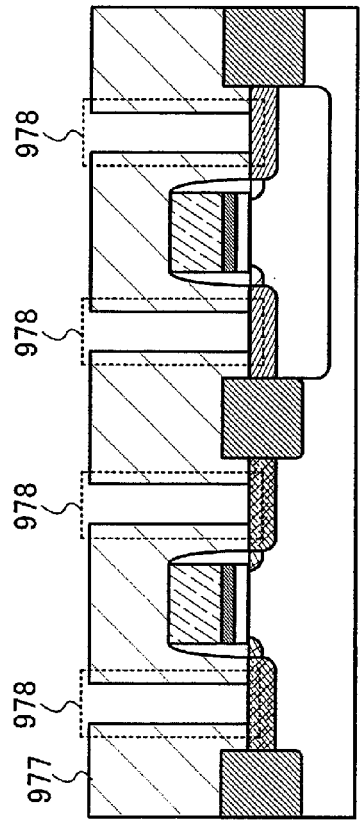
FIGS. 22A and 22B are diagrams illustrating a manufacturing process of a semiconductor device of the present invention.

Next, an insulating film is formed so as to cover the insulating films, the conductive films, and the like which are provided over the regions 912 and 913 of the substrate 900, and openings 978 are formed in the insulating film to form an insulating film 977 (see FIG. 22A).

The insulating film 977 can be provided by a CVD method, a sputtering method, or the like as a single-layer or stacked layers with a film which includes an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); or a film containing an organic material, such as epoxy, polyimide, polyamide, polyvinyl phenol, benzocyclobutene, or acrylic, or a siloxane material, such as a siloxane resin. Note that a siloxane material corresponds to a material having a Si—O—Si bond. Siloxane has a backbone structure formed of bonds of silicon and oxygen. As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

Next, conductive films 980 are formed in the openings 978 by a CVD method or the like. Then, conductive films 982a to 982d are selectively formed over the insulating film 977 so as to be electrically connected to the conductive films 980 (see FIG. 22B).

The conductive films 980 and 982a to 982d are formed as a single-layer or stacked layers formed of an element selected from such as aluminum, tungsten, titanium, tantalum, molybdenum, nickel, platinum, copper, gold, silver, manganese, neodymium, carbon, and silicon, or an alloy material or a compound material containing such an element as a main component. An alloy material containing aluminum as a main component corresponds to, for example, a material which contains aluminum as a main component and also contains nickel, or a material which contains aluminum as a main component and also contains nickel and one or both of carbon and silicon. The conductive films 980 and 982a to 982d are preferably formed to have a stacked structure of a barrier film, an aluminum film containing silicon, and a barrier film or a stacked structure of a barrier film, an aluminum film containing silicon, a titanium nitride film, and a barrier film. Note that "barrier film" corresponds to a thin film made of titanium, titanium nitride, molybdenum, or molybdenum nitride. Aluminum and aluminum containing silicon, which have low resistance and are inexpensive, are the most suitable material for forming the conductive films 980. When barrier films are provided in the top layer and the bottom layer, generation of hillocks of aluminum or aluminum containing silicon can be prevented. When a barrier film made of titanium which is an element having a high reducing property is formed, even when there is a thin natural oxide film formed on the crystalline semiconductor film, the natural oxide film can be chemically reduced, and a favorable contact between the conductive films 980 and the crystalline semiconductor film can be obtained. Here, the conductive films 980 can be formed by selectively growing tungsten by a CVD method.

Through the above steps, a p-channel transistor formed in the region 912 of the substrate 900 and an N-channel transistor formed in the region 913 of the substrate 900 can be obtained.

Note that the structure of the transistor forming the semiconductor device of the present invention is not limited to the one shown in the drawings. For example, a transistor with an inversely staggered structure, a fin FET structure, or the like can be used. A fin FET structure is advantageous in that it can suppress a short channel effect which would occur with the reduction of transistor size.

Further, in the semiconductor device of the present invention, a battery which can accumulate electric power in the signal processing circuit is provided. As the battery, it is preferable to use a capacitor such as an electrical double layer capacitor or a thin film secondary battery. In this embodiment mode, a connection between a transistor and a thin film secondary battery is described.

Figure 22B:
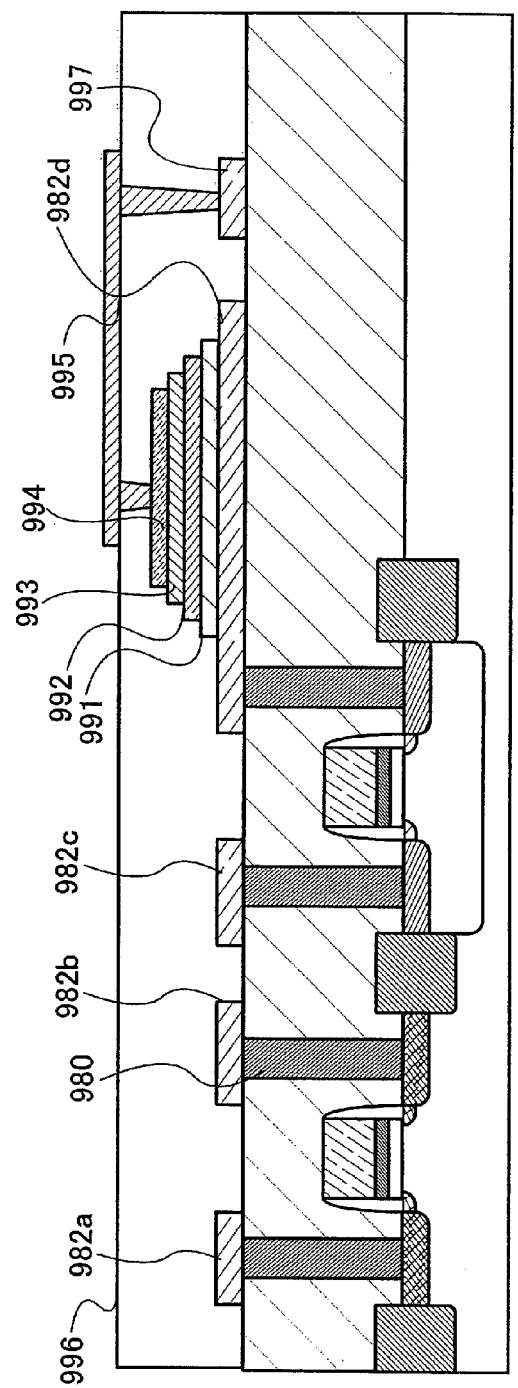

In this embodiment mode, the secondary battery is stacked and formed over the conductive film 982*d*, which are connected to a transistor. For the secondary battery, a current-collecting thin film, a negative electrode active material layer, a solid electrolyte layer, a positive electrode active material layer, and a current-collecting thin film are stacked in order (FIG. 22B). Accordingly, a material of the conductive film 982*d*, which doubles as the current-collecting thin film of the secondary battery, is desired to have good adhesion to the negative electrode active material and have low resistance, and aluminum, copper, nickel, vanadium, or the like is particularly preferable as the material.

A structure of the thin film secondary battery is described in detail. First, a negative electrode active material layer 991 is formed over the conductive film 982*d*. In general, vanadium oxide ($V_2O_5$) or the like is used. Next, a solid electrolyte layer 992 is formed over the negative electrode active material layer 991. In general, lithium phosphate ($Li_3PO_4$) or the like is used. Then, a positive electrode active material layer 993 is formed over the solid electrolyte layer 992. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 994 that becomes an electrode is formed over the positive electrode active material layer 993. The current-collecting thin film 994 is desired to have good adhesion to the positive electrode active material layer 993 and have low resistance and aluminum, copper, nickel, vanadium, or the like can be used.

Each of the foregoing thin film layers, that is, the negative electrode active material layer 991, the solid electrolyte layer 992, the positive electrode active material layer 993, and the current-collecting thin film 994, may be formed using a sputtering technique or an evaporation technique. Further, the thickness of each layer is desirably 1 to 3 μm.

Next, a resin film is formed by a spin coating method or the like. Then, the resin film is etched to form a contact hole and an interlayer film 996 is formed. The interlayer film 996 is not limited to a resin film, and may be another film such as an oxide film or the like formed by a CVD method; however, a resin is desirable in terms of flatness. Alternatively, a contact hole may be formed without etching, using a photosensitive resin. Subsequently, by forming a wiring layer 995 over the interlayer film 996 and connecting to a conductive film 997, electrical connection of the thin film secondary battery is obtained.

With such a structure as the foregoing structure, the semiconductor device of the present invention can have a structure in which a transistor is formed on a single-crystal substrate and a thin film secondary battery is provided thereover. Accordingly, in by the present invention, an ultra thin and compact semiconductor device can be manufactured.

The manufacturing method of the semiconductor device of this embodiment can be applied to the semiconductor devices of other embodiment modes described in this specification. In other words, in accordance with this embodiment mode, the semiconductor device which can communicate or supply electric power in a plurality of frequency bands using one antenna can be manufactured.

[EMBODIMENT MODE 7]

Figure 23E:
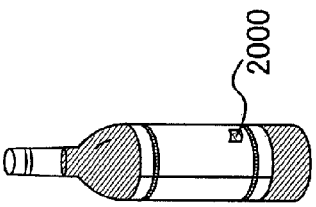
FIG. 23A to 23F are examples of mounting a semiconductor device of the present invention to an object.
Figure 23F:
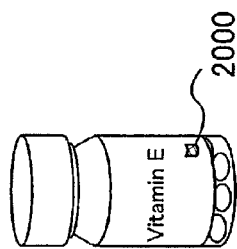
Figure 23C:
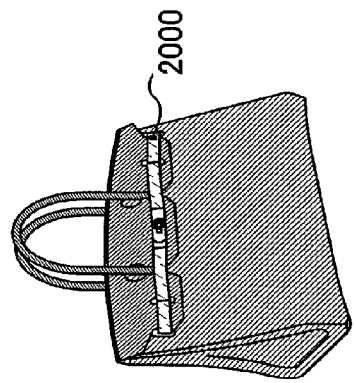
Figure 23D:
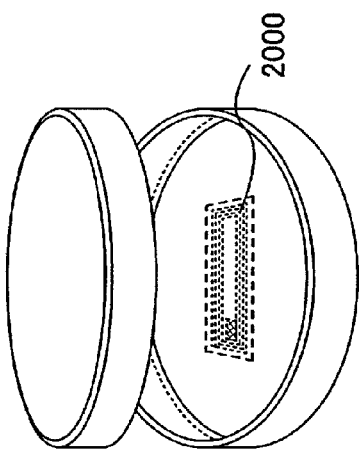
Figure 23A:
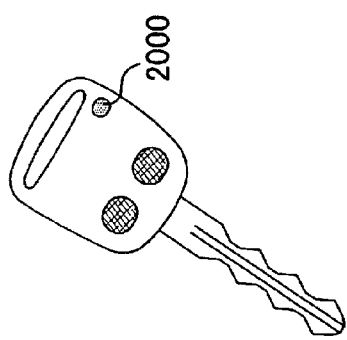
Figure 23B:
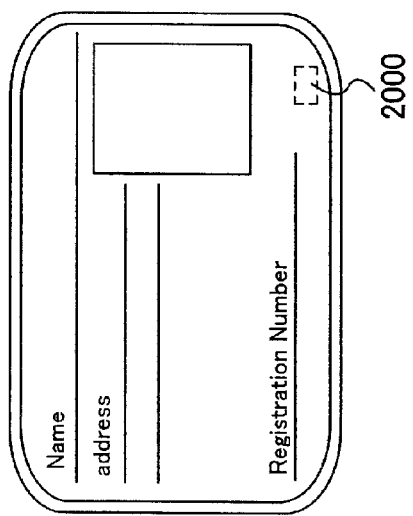
Figure 24A:
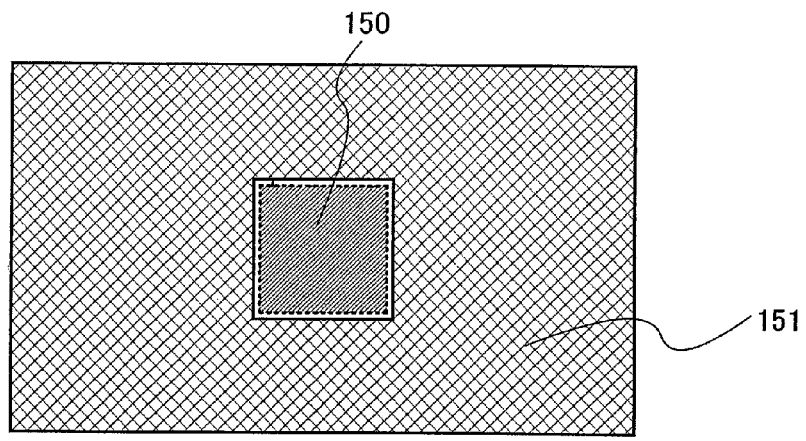
FIG. 24A to 24D are diagrams illustrating examples of a shape of an antenna of the present invention.
Figure 24B:
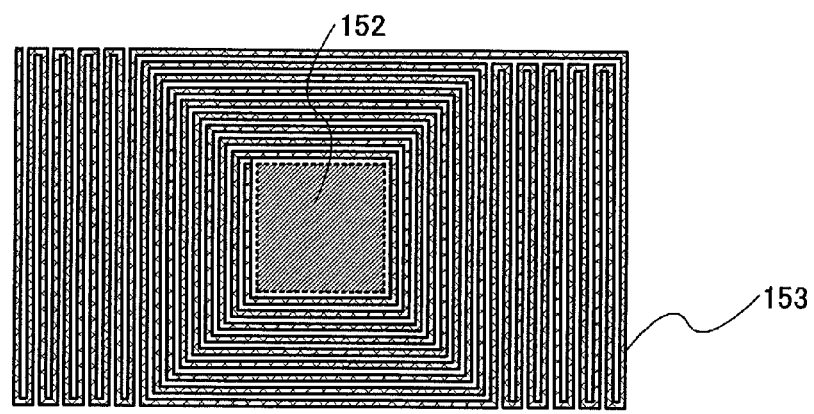
Figure 24C:
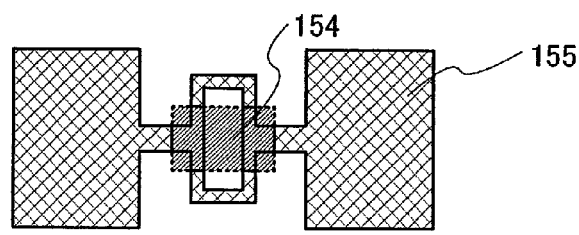
Figure 24D:
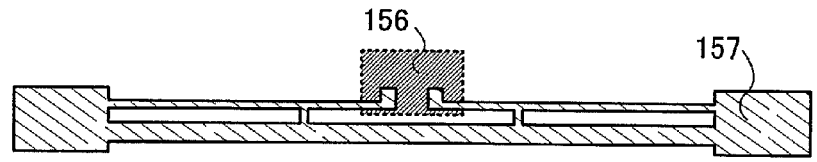

A semiconductor device 2000 which is manufactured by applying the foregoing embodiment modes can be used for various objects and systems utilizing a function of transmitting or receiving electromagnetic waves. The objects include, for example, keys (see FIG. 23A), bills, coins, securities, bearer bonds, certificates (driver's licenses, resident's cards, or the like, see FIG. 23B), books, packing containers (laboratory dishes or the like; see FIG. 23C), packing containers (wrapping paper, bottles, or the like; refer to FIGS. 23E and F), recording media (disks, video tapes, or the like), vehicles (bicycles or the like), personal accessories and ornaments (bags, a pair of glasses, or the like; see FIG. 23D), foods, clothing, everyday articles, and electronic devices (liquid crystal display devices, EL display devices, television devices, portable terminals, or the like). The semiconductor device of the present invention is fixed by being attached to the surfaces of the objects having various forms as described above or by being embedded into the objects. In addition, the systems include a product management system, an authorization function system, a distribution system, and the like.

For example, by a semiconductor device capable of wireless communication being mounted on a key, a product management system which prevents a person from forgetting carrying a key to carry can be obtained. In addition, by a semiconductor device capable of wireless communication mounted on a document or the like, an authorization function system which prevents counterfeiting can be obtained. In addition, by a semiconductor device of the present invention mounted on packing containers, a distribution system which can control inventory can be obtained.

The semiconductor device of this embodiment mode can communicate in a plurality of frequency bands, or ensure electric power using one antenna. In addition, when electromagnetic waves in different frequency bands are received, electric power is supplied using the best frequency band by matching impedances automatically. Accordingly, by applying a semiconductor device of the present invention to the foregoing systems, reduction in size of the system is not prevented, electric power can be supplied efficiently, and reliability of the system can be improved. Further, even when the semiconductor device has higher function and the power consumption is increased, the system can have higher added value because required electric power to operate the semiconductor device can be supplied.

This application is based on Japanese Patent Application serial no. 2007-030148 filed with Japan Patent Office on Feb. 9, 2007, the entire contents of which are hereby incorporated by reference.

What is claimed is:

1. A semiconductor device comprising:
an antenna; and
a frequency determining circuit,
wherein the antenna includes a first portion and a second portion,
wherein a first switch is provided between the first portion and the second portion,
wherein the first portion and the second portion are electrically connected to the first switch,
wherein a first terminal of the frequency determining circuit is electrically connected to a second terminal of the antenna, and
wherein the frequency determining circuit is configured to control the first switch in accordance with a frequency of electromagnetic waves received by the antenna.

2. The semiconductor device according to claim 1,
wherein the first switch is a transistor.

3. The semiconductor device according to claim 1,
wherein the semiconductor device has a wirelessly chargeable battery.

4. A semiconductor device comprising:
an antenna;
a frequency determining circuit; and
a demodulation circuit,
wherein the antenna includes a first portion and a second portion,
wherein a first switch is provided between the first portion and the second portion,
wherein the first portion and the second portion are electrically connected to the first switch,
wherein a first terminal of the frequency determining circuit is electrically connected to a second terminal of the demodulation circuit,
wherein a third terminal of the demodulation circuit is electrically connected to a fourth terminal of the antenna, and
wherein the frequency determining circuit is configured to control the first switch in accordance with a frequency of electromagnetic waves received by the antenna.

5. The semiconductor device according to claim 4,
wherein the demodulation circuit comprises a fifth terminal, and
wherein the fifth terminal of the demodulation circuit is electrically connected to a sixth circuit of a rectifier circuit.

6. The semiconductor device capable of wireless communication according to claim 4,
wherein the first switch is a transistor.

7. The semiconductor device capable of wireless communication according to claim 4,
wherein the semiconductor device has a wirelessly chargeable battery.

8. A semiconductor device comprising:
an antenna;
a frequency determining circuit; and
a rectifier circuit,
wherein the antenna includes a first portion and a second portion,
wherein a first switch is provided between the first portion and the second portion,
wherein the first portion and the second portion are electrically connected to the first switch,
wherein a first terminal of the frequency determining circuit is electrically connected to a second terminal of the rectifier circuit,
wherein a third terminal of the rectifier circuit is electrically connected to a fourth terminal of the antenna, and
wherein the frequency determining circuit is configured to control the first switch in accordance with a frequency of electromagnetic waves received by the antenna.

9. The semiconductor device according to claim 8,
wherein the first switch is a transistor.

10. The semiconductor device according to claim 8,
wherein the semiconductor device has a wirelessly chargeable battery.

* * * * *